(12) United States Patent
Mihara et al.

(10) Patent No.: US 7,035,334 B2
(45) Date of Patent: Apr. 25, 2006

(54) DEVICE AND METHOD FOR CONTROLLING IMAGE ENCODING, ENCODING SYSTEM, TRANSMISSION SYSTEM AND BROADCAST SYSTEM

(75) Inventors: Kanji Mihara, Kanagawa (JP); Takuya Kitamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/832,665

(22) Filed: Apr. 23, 2004

(65) Prior Publication Data

US 2004/0196907 A1    Oct. 7, 2004

Related U.S. Application Data

(60) Division of application No. 09/257,127, filed on Feb. 25, 1999, now abandoned, which is a continuation of application No. PCT/JP98/02967, filed on Jul. 1, 1998.

(30) Foreign Application Priority Data

Jul. 1, 1997    (JP) ................................... 9-176155
Jul. 1, 1998    (WO) ....................... PCT/JP98/02967

(51) Int. Cl.
H04N 7/12    (2006.01)

(52) U.S. Cl. ............................................. 375/240.12

(58) Field of Classification Search ........... 375/240.01, 375/240.02, 240.03, 240.12, 240.26; 382/232, 382/234, 238, 239; 708/203; 709/247; H04N 7/12
See application file for complete search history.

(56) References Cited

U.S. PATENT DOCUMENTS 5,426,463 A    6/1995    Reininger et al. ..... 375/240.03

(Continued)

FOREIGN PATENT DOCUMENTS

JP    06062393 A    3/1994

(Continued)

OTHER PUBLICATIONS

Lakshman T V et al: "Transporting compressed video over ATM networks with explicit rate feedback control" Infocom '97. Sixteenth Annual Joint Conference of the IEEE Computer and Communications Societies. Driving the Information Revolution., Proceedings IEEE Kobe, Japan Apr. 7-11, 1997, Los Alamitos, CA, USA,IEEE Comput. Soc, US, vol. 1, Apr. 7, 1997, pp. 38-47, XP010251988 ISBN: 0-8186-7780-5.

(Continued)

*Primary Examiner*—Young Lee
(74) *Attorney, Agent, or Firm*—Frommer Lawrence & Haug LLP; William S. Frommer; Thomas F. Presson

(57) ABSTRACT

The present invention employs a statistical multiplexing method to enable suitable assignment of a target code rate to each program data. A controller (3) acquires encoding difficulty (Di) of each program from each of image encoders (2i). In accordance with an equation for transforming the encoding difficulty (Di) into a bit rate, the controller (3) calculates a temporary bit rate (Tmp_Ratei). Moreover, the controller (3) causes the sum of the target bit rates (Target_Ratei) to satisfy a predetermined allowable value by correcting the temporary bit rate (Tmp_Ratei) so as to determine a final target bit rate (Target_Ratei) and inputting the final target bit rate (Target_Ratei) to each of the image encoders (2i).

8 Claims, 11 Drawing Sheets

U.S. PATENT DOCUMENTS 5,506,844 A 4/1996 Rao
5,623,424 A 4/1997 Azadegan et al. .......... 708/203
5,754,231 A 5/1998 Odaka et al. .......... 375/240.01

FOREIGN PATENT DOCUMENTS

| JP | 07184192 A | 7/1995 |
|---|---|---|
| JP | 07264580 A | 10/1995 |
| WO | WO 95 29545 | 11/1995 |

OTHER PUBLICATIONS

Keesman G: "Multi-program video compression using joint bit-rate control" Philips Journal of Research, Elsevier, Amsterdam, NL, vol. 50, No. 1, 1996, pp. 21-45, XP004008201 ISSN: 0165-5817.

Ferit Yegenoglu: "Motion-Classified Autoregressive Modeling of Variable Bit Rate Video" IEEE Transactions on Circuits and Systems for Video Technology, IEEE Inc. New York, US, vol. 3, No. 1, Feb. 1, 1993, pp. 42-53, XP000334578 ISSN: 1051-8215.

DEVICE AND METHOD FOR CONTROLLING IMAGE ENCODING, ENCODING SYSTEM, TRANSMISSION SYSTEM AND BROADCAST SYSTEM

This application is a divisional of Ser. No. 09/257,127, filed Feb. 25, 1999, now abandoned, which is a continuation of copending International Application PCT/JP98/02967 having an international filing date of 1 Jul. 1998, and which applications are hereby incorporated by reference.

TECHNICAL FIELD

The present invention relates to a device and method for controlling image encoding for compression-encoding image data, an encoding system, a transmission system and a broadcast system.

BACKGROUND ART

Recently digital broadcast for transmitting/receiving image data and the like as digital data has been attracted attention. The digital broadcast has an advantage that a multiplicity of program data (hereinafter, referred to as program) can be transmitted as compared with analog broadcast in the case that the same transmission path is used. The reason for this greatly depends on a fact that image data to be transmitted can be compressed. As a method for compressing image data, for example, a bidirectional predictive encoding method adopted in an MPEG (Moving Picture Experts Group) standard has been employed. In the bidirectional predictive encoding method, three type of encoding are performed, which are intra-frame encoding, intra-frame forward predictive encoding and bidirectional predictive encoding, respectively. Images formed by the respective encoding methods are called, I picture (intra encoded picture), P picture (predictive encoded picture) and B picture (bidirectionally predictive encoded picture), respectively.

In a compression-encoding of an image for digital broadcasting, high image quality must be maintained while the quantity of compression-encoded data (an amount of bits) is suppressed to at most a transmission capacity of the transmission path.

A technique called "statistical multiplexing" may be employed to transmit more programs to a transmission path having a predetermined transmission capacity. The statistical multiplexing technique is a technique in which the transmission rate of each program is dynamically changed to transmit more programs. In the statistical multiplexing technique, the transmission rate of each program whose image quality does not deteriorate even if the transmission rate thereof is reduced is reduced to allow more programs to be transmitted.

Referring to FIGS. 12 and 13, the statistical multiplexing technique will further be described.

FIG. 12 shows an example of assigned code rates to respective programs when the programs are multiplexed by conventional fixed rates, wherein the axis of ordinate denotes the assigned code rates to the respective programs, while the axis of abscissa denotes time. As shown in FIG. 12, assigned code rates to respective programs, such as a weather forecast and news and a drama, which are multiplexed are kept at code rates assigned as initial values, which have not been changed according to time elapse. The code rates which are assigned to the respective programs as the initial values are assigned such that deteriorations of image quality in portions (time) of the respective program whose deteriorations of image quality are conspicuous is in allowable ranges. As a result, excessively high code rates are assigned to portions except for the portions in which the deteriorations of image quality are conspicuous.

FIG. 13 shows an example of assigned code rates to the respective programs when the code rates assigned to the respective programs are dynamically changed and multiplexed by using the statistical multiplexing technique, wherein the axis of ordinate denotes code rates assigned to the respective programs, while the axis of abscissa denotes time. The statistical multiplexing technique uses a fact that portions (time) of programs whose deteriorations of image quality in the respective programs are conspicuous unusually occur simultaneously. Since there are many cases where portions of a program whose deteriorations of image quality are conspicuous, correspond to portions of the other programs whose deterioration of image quality are inconspicuous even if the code rates thereof are reduced, a great code rate can be assigned to the program whose deteriorations of image quality are conspicuous by reducing the code rates of the other programs. In an example shown in FIG. 13, when a portion of drama (1) is conspicuous in deterioration of image quality and portions of news and drama (2) are inconspicuous in deterioration of image quality at time P, the code rates of the news and the drama (2) are reduced to assigne the drama (1) additionally with the code rate corresponding to the code rate thus reduced. Thus, employment of the statistical multiplexing technique enables a larger number of programs than usual to be transmitted.

A bit rate assigning method for determining bit rate amounts as code rates assigned to respective programs is an important factor for the statistical multiplexing technique to determine image quality or the like. As a representative technique which has conventionally been suggested as the bit rate assigning method there is a technique that quantizing steps for respective programs are monitored and feedback-controlled such that the quantizing steps are made equal to all of the programs or are balanced in accordance with weightings previously set to the respective programs. In the feedback control, since after completion of encoding of an image the next bit rate is determined in accordance with the quantizing step applied for encoding the image, if a picture is rapidly changed to a complicated picture because of scene change or the like, response delay is caused, which results in a problem in that image distortion excessively takes place.

On the other hand, to solve the problem of the response delay in the control system in which the feedback control is performed, the applicant of the present invention has proposed a technique called "feedforward control" in which encoding difficulty representing encoding difficulty in encoding regarding an image to be encoded is obtained in advance and the bit rate for each program is determined in accordance with the encoding difficulty. The feedforward control technique is realized by distributing the total bit rate after multiplexing to the respective programs in accordance with the ratios of encoding difficulty data basically obtained from the respective programs prior to the encoding processing. The distribution of the bit rate to the respective programs in accordance with the ratios of encoding difficulty data is determined by a proportional distribution expressed by the following Equation (1):

$$R_i = (D_i/\Sigma D_k) \times \text{Total\_Rate} \quad (1)$$

where $R_i$ denotes a bit rate of an i th program, $D_i$ denotes the encoding difficulty of the program per unit time, Total\_Rate denotes a total bit rate and Σ denotes the sum in the case of k=1 to k=L (L is the total number of the programs).

Alternatively, the distributions of the bit rate to the respective programs is determined by the following Equation (2) by adding the weighting coefficient $W_i$ to the respective programs:

$$R_i = \{W_i \times D_i / \Sigma(W_k \times D_k)\} \times \text{Total\_Rate} \qquad (2)$$

The proportional distribution of the bit rate in accordance with the encoding difficulty, however, has the following problems.

(1) The proportional distribution in accordance with the encoding difficulty is not necessarily optimum for the visibility characteristic for a human being. For example, in the case of a simple picture in which the encoding difficulty is reduced, the bit rate is suppressed low and, human visual characteristic tends to find a distortion easily, on the contrary, in the case of a complicated picture, human visual characteristic tends not to find a distortion easily. Therefore, if the total bit rate is simply proportionally distributed in accordance with the encoding difficulties for the respective programs using one equation to all of the programs, an amount of bits is excessively distributed in a program of complicated picture, on the contrary, in a program of a simple picture in which an amount of bits is reduced, a distortion resulted from encoding is conspicuous so that an audience feels uncomfortable.

(2) In general, a digital broadcast station using the statistical multiplexing method bills companies, which present programs, to correspond to the amount of occupation of the bit rates. In the foregoing case, the digital broadcast station is required to previously assign an average bit rate to correspond to the budget of each company for presenting the program. However, a system using the statistical multiplexing method encounters dynamic change in the bit rate. Thus, accurate billing to correspond to the budget has been inhibited because an accurate average bit rate cannot be obtained.

DISCLOSURE OF INVENTION

Accordingly, an object of the present invention is to provide a device and method for controlling image encoding which employs a statistical multiplexing method and which is able to assign a suitable target code rate to each program data, an encoding system, a transmission system and a broadcast system.

A device for controlling image encoding according to the present invention is for use in a system provided with a plurality of encoding means for encoding a plurality of program data, each including image data, and multiplexing means for multiplexing output data of each of the encoding means, said image encoding control apparatus controlling each of the encoding means by setting a target code rate to each of the encoding means as a target amount of codes to be generated per unit time, and comprising:

a temporary target-code-rate determining means for acquiring encoding difficulty which indicates difficulty in encoding for each program data, and for determining a temporary target code rate for each program data which corresponds to the acquired encoding difficulty for each program data by using a corresponding relationship between the encoding difficulty and a target code rate set for each program data; and a target-code-rate correcting means for correcting the temporary target code rate determined by the temporary target-code-rate determining means in such a manner that the sum of the target code rates for each program data is within a specific allowable value range so as to determine a final target code rate for each program data, and for setting the final target code rate to each of the encoding means.

The device for controlling image encoding has the temporary target-code-rate determining means which acquires, for each program data, the encoding difficulty indicating the encoding difficulty in encoding. The corresponding relationship between the encoding difficulty set for each program data and the target code rate is used to determine a temporary target code rate for each program data which corresponds to the acquired encoding difficulty for each program data. The temporary target code rate is modified by the target-code-rate modifying means in such a manner that the sum of the target code rates for each program data is within a specific allowable value range so that a final target code rate for each program data is determined which is set to each encoding means.

A method for controlling image encoding according to the present invention is for use in a system provided with a plurality of encoding means for encoding a plurality of program data, each including image data, and multiplexing means for multiplexing output data of each of the encoding means, in which a target code rate is set to each of the encoding means as a target amount of codes to be generated per unit time so as to control each of the encoding means, said image encoding control method including:

a temporary target-code-rate determining step for acquiring encoding difficulty which indicates encoding difficulty in encoding for each program data, and for determining a temporary target code rate for each program data which corresponds to the acquired encoding difficulty for each program data by using a corresponding relationship between the encoding difficulty and a target code rate set for each program data; and a target-code-rate correcting step for correcting the temporary target code rate determined in the temporary target code rate determining step in such a manner that the sum of target code rates for each program data is within a specific allowable value range so as to determine a final target code rate for each program data, and for setting the final target code rate to each of the encoding means.

The method for controlling image encoding has the temporary-target-code-rate determining step in which the encoding difficulty is acquired for each program data. The corresponding relationship between the encoding difficulty set for each program data and the target code rate is used to determine the temporary target code rate for each program data corresponding to the encoding difficulty for each program data. Moreover, in the target-code-rate modifying step, the sum of the target code rates for each program data is caused to satisfy a predetermined allowable value by modifying the temporary target code rate for each program data so that the final target code rate is determined.

An encoding system according to the present invention is a system for encoding a plurality of program data each of which includes image data to multiplex encoded program data, the encoding system comprising:

a plurality of encoding difficulty detecting means for detecting, for each program data, encoding difficulty indicating encoding difficulty in encoding when image data included in each program data is encoded;

a plurality of encoding means each of which codes image data included in each program data based upon a input target code rate which is a target amount of codes which must be generated per unit time;

multiplexing means for multiplexing data encoded by the encoding means; and control means for calculating a target code rate for each program data from the encoding difficulty detected by the encoding difficulty detecting means, based upon an equation individually set for each program data and applied for calculating the target code rate from the encoding difficulty, for inputting the calculated target code rate to each encoding means.

The control means, for example, calculates the target code rate in accordance with an equation individually set to each program data so as to calculate the target code rate of the encoding difficulty.

The control means, for example, calculates the target code rate in accordance with an equation determined based upon an average value of the target code rate previously determined for each program data, individually set for each program data and applied for calculating the target code rate from the encoding difficulty.

The control means calculates, for each program data, a temporary code rate for each program data from the encoding difficulty detected by the encoding difficulty detecting means, and calculates a target code rate for each program from the temporary target code rate in such a manner that the sum of the temporary target code rates calculated for each program data is within a specific allowable range.

The control means calculates, for each program data, a temporary code rate for each program data from the encoding difficulty detected by the encoding difficulty detecting means regardless of the encoding difficulty in other program data, and calculates a target code rate for each program from the temporary target code rate in such a manner that the sum of the temporary target code rates calculated for each program data is within a specific allowable range.

The control means calculates a temporary code rate for each program data from the encoding difficulty detected by the encoding difficulty detecting means, based upon an equation for calculating a temporary target code rate from the encoding difficulty, which is individually set for each program data and which is not affected by the encoding difficulty of the other program data, and calculates a target code rate for each program data from the temporary target code rate in such a manner that the sum of the temporary target code rates calculated for each program data is within a specific allowable range.

A transmission system according to the present invention is a system for encoding a plurality of program data each of which includes image data, multiplexing encoded program data and transmitting, as transmission data, encoded data, the transmission system comprising:

a plurality of encoding difficulty detecting means for detecting, for each program data, encoding difficulty indicating encoding difficulty in encoding when image data included in each program data is encoded;

a plurality of encoding means for encoding image data included in each program data in accordance with a input target code rate which is a target amount of codes which must be generated per unit time;

multiplexing means for multiplexing data encoded by each encoding means to transmit multiplexed data as transmission data; and control means for calculating a target code rate for each program data from the encoding difficulty detected by the encoding difficulty detecting means, based upon an equation individually set to each program data and applied for calculating the target code rate from the encoding difficulty, and inputting the calculated target code rate to each encoding means. Features of the control means are the same as those of the control means in the encoding system.

A broadcast system for encoding a plurality of program data each of which includes image data, multiplexing encoded data and transmitting, as broadcast data, encoded data, the broadcast system comprising:

a plurality of encoding difficulty detecting means for detecting, for each program data, encoding difficulty indicating encoding difficulty in encoding when image data included in each program data is encoded;

a plurality of encoding means for encoding image data included in each program data based upon a input target code rate which is a target amount of codes which must be generated per unit time;

multiplexing means for multiplexing data encoded by each encoding means to transmit multiplexed data as broadcast data; and control means for calculating a target code rate for each program data from the encoding difficulty detected by the encoding difficulty detecting means based upon an equation individually set to each program data and applied for calculating the target code rate from the encoding difficulty and inputting the calculated target code rate to each encoding means. Features of the control means are the same as those of the control means in the encoding system.

Other and further objects, features and advantages of the invention will be evident from the following detailed description of the preferred embodiments.

BEST MODE FOR CARRYING OUT THE INVENTION

Below, embodiments of the present invention will be described with reference to the drawings.

Figure 1:
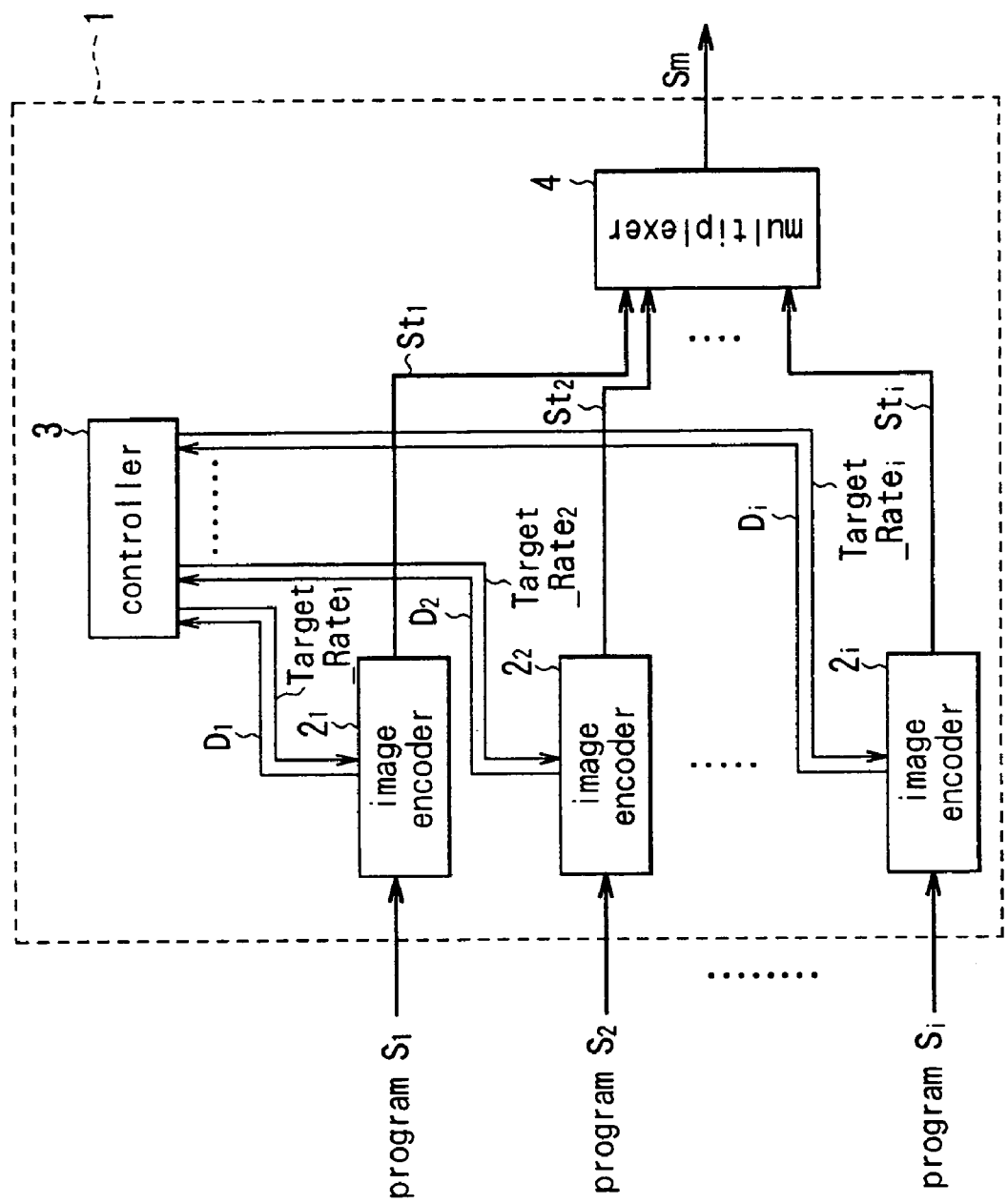
FIG. 1 is a block diagram showing a schematic structure of a statistical multiplexing system including a device for controlling image encoding according to an embodiment of the present invention.

FIG. 1 is block diagram showing an example of a statistical multiplexing system including a controller as a device for controlling image encoding according to an embodiment of the present invention; image encoders as a plurality of encoding means for encoding a plurality of program data and a multiplexer for multiplexing output data of the respective encoding means. The statistical multiplexing system 1 corresponds to an encoding system, a transmission system and a broadcast system according to the present invention. The statistical multiplexing system 1 comprises a plurality of image encoders $2_i$ for inputting programs $S_i$ ($i$ is an integer not smaller than 1) as program data according to the present invention, to compression-code the program data $S_i$; a controller 3 as a device for controlling image encoding according to the present embodiment for performing bit-rate control of a feedforward type according to the present embodiment; and a multiplexer 4 for multiplexing compressively encoded data $St_i$ output from the respective image encoders $2_i$ so as to output image data $S_m$ to a transmission path. When the statistical multiplexing system 1 is used as a transmission system, the statistical multiplexing system 1 outputs the image data $S_m$ of the multiplexer 4 to the transmission path as data for a transmission. When the statistical multiplexing system 1 is used as a broadcast system, the statistical multiplexing system 1 transmits, image data $S_m$ output from the multiplexer 4 as data for a broadcast to a receiving apparatus side through a transmission path for a broadcast.

Figure 3:
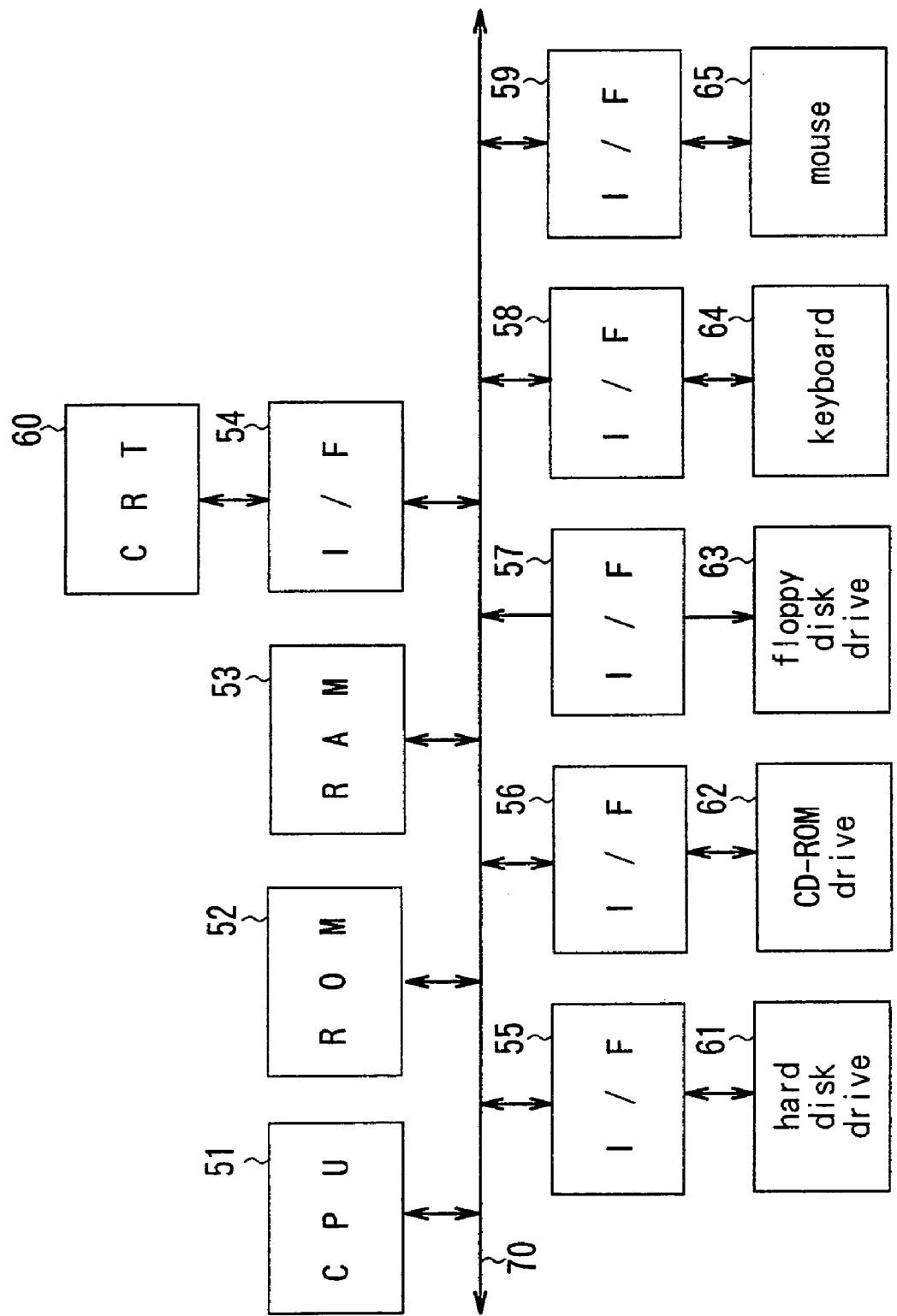
FIG. 3 is a block diagram showing a structure of the hardware of the controller shown in FIG. 1.

FIG. 3 is a block diagram showing the hardware structure of the controller 3 shown in FIG. 1. The controller 3 comprises a CPU (Central Processing Unit) 51; a ROM (Read Only Memory) 52; a RAM (Random Access Memory) 53 serving as a working region; and a bus 70 to which the foregoing elements are connected. Moreover, the controller 3 comprises a CRT (Cathode Ray Tube) 60; a hard disk drive 61; a CD (Compact Disk)-ROM drive 62; a floppy disk drive 63; a keyboard 64; and a mouse 65 which are connected to the bus 70 through interfaces (expressed as "I/F" in FIG. 3) 54 to 59 respectively.

In the controller 3, The CPU 51 uses the RAM 53 as the working region to perform a bit-rate control program stored in, for example, the ROM 52 or a hard disk drive 61 so that the respective functions as described below are realized. The bit-rate control program may be recorded on a CD-ROM which is driven by the CD-ROM drive 62 or a floppy disk which is driven by the floppy disk drive 63 so as to be installed medium on the hard disk in the hard disk drive 61 from these records.

Figure 2:
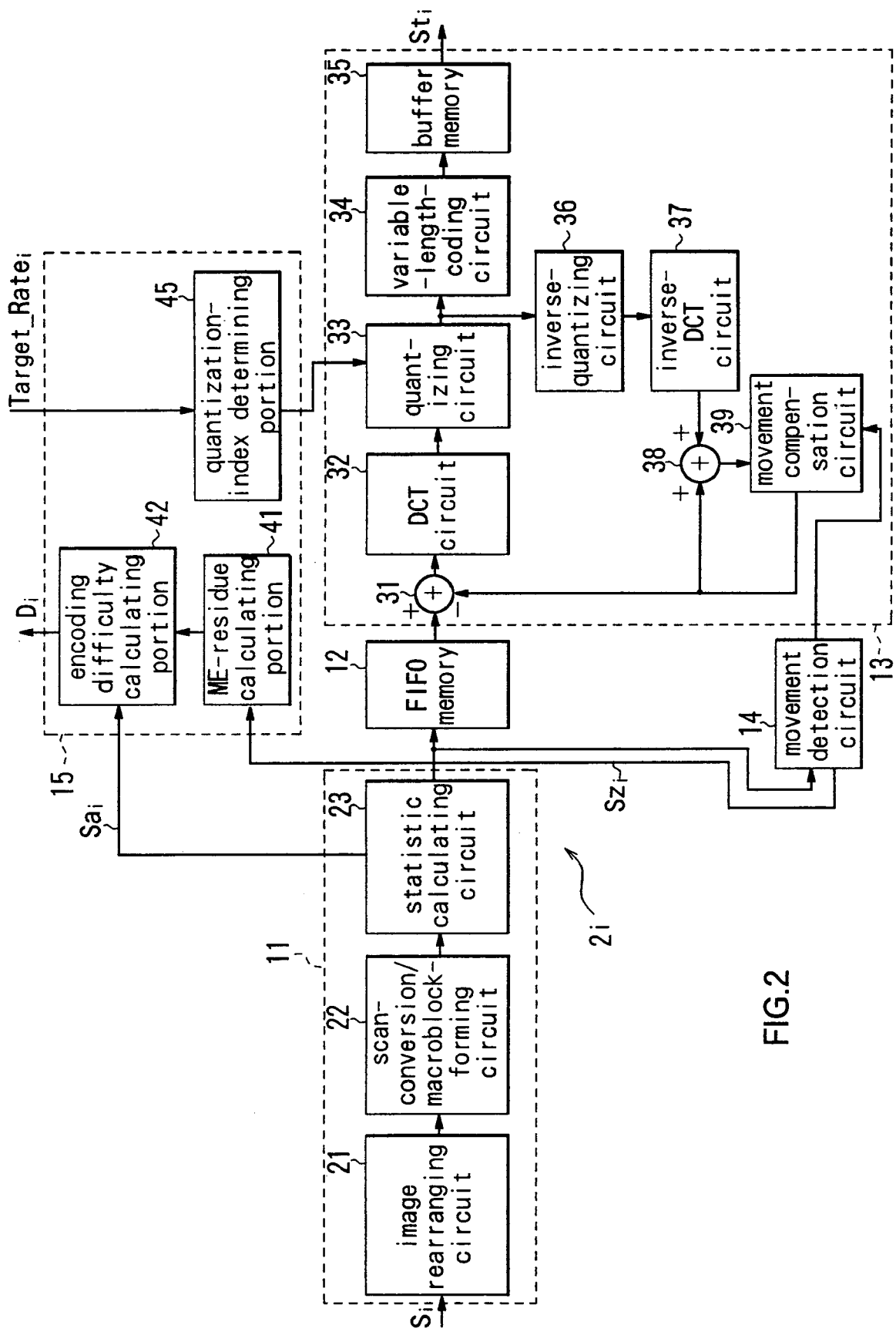
FIG. 2 is a block diagram showing a schematic structure of the device for controlling image encoding shown in FIG. 1.

FIG. 2 is a block diagram showing a detailed structure of the image encoder $2_i$ shown in FIG. 1. As shown in the drawing, the image encoder $2_i$ comprises an encoder control unit 11 for inputting the programs $S_i$ to perform pre-processing and the like for compression-encoding; an FIFO (First-IN, First-Out) memory 12 for outputting an output data of the encoder control unit 11 by delaying for predetermined time; an encoder 13 for inputting an output data of the FIFO memory 12 to compression-code the output data by an encoding method corresponding to the picture type for picture so as to output a compressed image data $St_i$; a movement detecting circuit 14 for detecting a movement vector in accordance with output data of the encoder control unit 11 so as to transmit the movement vector to the encoder 13; and an encoding control portion 15 for controlling the encoder 13 based upon the statistics data $Sa_i$ output from the encoder control unit 11 and ME residual data $Sz_i$ output from the movement detecting circuit 14. Note that the ME residual is, in brief, the sum of absolute values or the sum of squares of movement predictive errors for the overall picture. ME residual data $Sz_i$ is a data for obtaining the ME residual, which will be described later in detail.

The encoder control unit 11 comprises an image rearranging circuit 21 for inputting the programs $S_i$ and rearranging the order of pictures (I pictures, P pictures and B pictures) in accordance with the order of encoding; a scan-conversion/macroblocking circuit 22 for inputting output data of the image rearranging circuit 21, determining whether input data has a frame structure or a field structure, and performing scan conversion in accordance with the result of determination and macroblocking composed of 16×16 pixels; and a statistic calculating circuit 23 for calculating the statistics of intra-AC, activity, flatness and the like in the I picture to transmit statistics data $Sa_i$ to the encoding control portion 15 and transmit the output data of the scan-conversion/macroblocking circuit 22 to the FIFO memory 12 and the movement detecting circuit 14. The intra-AC, the activity and the flatness will be described later in detail.

The encoder 13 comprises a subtraction circuit 31 for obtaining the difference between the output data of the FIFO memory 12 and the predictive image data; a DCT circuit 32 for performing DCT for the output data of the subtraction circuit 31 in DCT block units so as to output a DCT coefficient; a quantizing circuit 33 for quantizing the output data of the DCT circuit 32; a variable-length encoding circuit 34 for variable-length encoding the output data of the quantizing circuit 33; a buffer memory 35 for temporarily storing the output data of the variable-length encoding circuit 34 so as to output the data as compression-encoded data $St_i$ composed of bit streams; an inverse-quantizing circuit 36 for inversely quantizing output data of the quantizing circuit 33; an inverse-DCT circuit 37 for performing inverse DCT for output data of the inverse-quantizing circuit 36; an addition circuit 38 for adding the output data of the inverse-DCT circuit 37 and the predictive image data to output; and a movement compensation circuit 39 for storing the output data of the addition circuit 38 to perform movement compensation in accordance with the movement vector transmitted from the movement detecting circuit 14 so as to output the predictive image data to the subtraction circuit 31 and the addition circuit 38.

The movement detecting circuit 14 searches for an interest macroblock in a picture which must be an object to be compression-encoded and a macroblock in which the sum of absolute value or the sum of squares of the difference of the pixel value between the picture to be referred and the interest macroblock becomes minimum based upon the output data of the encoder control unit 11, so as to detect the movement vector and transmit the same to the movement compensation circuit 39. When the detecting circuit 14 obtains the movement vector, the detecting circuit 14 transmits, to the encoding control portion 15, the sum of absolute values or the sum of squares of the differences of the pixel values between macroblocks in which the difference has become minimum as ME residual data $Sz_i$.

The encoding control portion 15 comprises an ME-residual calculating portion 41 for calculating the ME residual which is a value of addition of the ME residual data $Sz_i$ of the movement detecting circuit 14 to the overall picture; and an encoding difficulty calculating portion 42 for calculating encoding difficulty $D_i$ indicating the encoding difficulty in encoding the picture based upon the ME residual calculated by the ME-residual calculating portion 41 and statistics data $Sa_i$ of the statistic calculating circuit 23 so as to transmit the encoding difficulty $D_i$ to the controller 3.

Moreover, the encoding control portion 15 comprises a quantization-index determining portion 45 for determining a quantization index corresponding to a quantization characteristic value in the quantizing circuit 33 in such a manner that a target bit rate $Target\_Rate_i$ is determined by the controller 3 based upon the encoding difficulty $D_i$ calculated by the encoding difficulty calculating portion 42 can be obtained so as to transmit to the quantizing circuit 33.

The encoding difficulty will now be described. The encoding difficulty indicates encoding difficulty in encoding the picture. That is, the encoding difficulty is a ratio of a quantity of data required to maintain the same image quality when the image has been encoded. A variety of methods may be employed to express the encoding difficulty. As a parameter for calculating the encoding difficulty, the ME residual, the intra-AC, the activity or the flatness may be employed. The intra-AC is defined as the sum of absolute values of differences between pixel values of pixels in 8×8 DCT (discrete cosine transformation) blocks in the I picture and an average value of pixel values in the DCT blocks. The intra-AC indicates the complexity of the picture. The activity indicates the complexity of a picture of an image. The activity is calculated in accordance with, for example, dispersion of pixel values of a luminance signal of an original image. The activity is used to calculate a quantizing value of a macroblock by, for example, TM5 (Test Model Editing Committee: "Test Model 5"; ISO/IEC JTC/SC292/WG11/N0400 (April 1933)). The flatness is defined as an index which indicates spatial flatness of an image, which represents complexity of an image and which has a correlation with the encoding difficulty of a picture of the image and a quantity of compressed data. As described above, the intra-AC and the activity indicate the complexity of the picture, the ME residual indicates the velocity of movement of the image and complexity of the picture and the flatness indicates the spatial flatness of the image. Since above-mentioned factors have strong correlation with the encoding difficulty in encoding a picture, the encoding difficulty in encoding can be calculated by using, for example, a direct function having the foregoing factors as variables.

The intra-AC which is an example of the statistics can be expressed by the following equation:

$$Intra\_AC = \Sigma |f_{curr}(x, y) - (\Sigma f_{curr})/N|$$

where $Intra\_AC$ denotes the intra-AC, $f_{curr}(x, y)$ denotes a pixel value of each pixel in the DCT block, $\Sigma f_{curr}$ denotes the sum of pixel values in the DCT block, N denotes the number of pixels in the DCT block. In addition, $\Sigma$ denotes the sum of pixels in the DCT block.

The applicant of the present invention has proposed a method of accurately expressing the encoding difficulty in a numerical form such as a method for momentarily updating the transformation by learning, which converts from a global complexity which is defined in TM5 and which is a parameter indicating the complexity of a screen in a picture of the same type as that encoded previously or a statistic (ME residual, activity, flatness and intra-AC) acquired prior to the encoding processing (hereinafter, referred to as previous reading) to the encoding difficulty. In this method, for example, whenever one picture is compressed, the global complexity is divided by the statistics read previously to calculate a weighting coefficient to be used in approximation of encoding difficulty data and update a weighting coefficient to be used in calculation processing. The weighting coefficient is updated so that an optimum weighting coefficient for the picture of image data can be used, therefore the encoding difficulty van be approximated by the statistics previously read with high accuracy.

When the encoding difficulty with high accuracy can be obtained based upon the statistics (intra-AC, activity and the like) previously read by the above-mentioned technique, target bit Target_Rate for the respective program in statistical multiplexing can be determined by using the encoding difficulty.

Next, a method for assigning the target bit rate to the respective programs based upon the encoding difficulty will now be described. An assumption is made that encoding difficulty data previously read is for 1 GOP (Group Of Picture) to simplify the description. Another assumption is made that 1 GOP include N pictures. That is, an assumption is made that when picture j of an i th program is encoded, encoding difficulty data $D_{i,j}$ to $D_i$, j+n−1 with respect to N pictures from picture j to picture j+N−1 have been obtained. To simplify the description, the respective image encoders can change the target bit rate for each frame. A method for assigning the target bit rate which is employed when the respective image encoder can change the target bit rate in only GOP units will be described in an example of a modification of the present embodiment.

The schematic operation which is performed by the controller 3 for determining the target bit rates which must be assigned to the programs will now be described. The controller 3 provides the equation for transforming the encoding difficulty into the target bit rate for each program as an equation expressing the correspondence between the encoding difficulty and the target bit rate. By using the transforming equation, a temporary bit rate, which is a temporary target code rate required by each program, is calculated. The ratio of a sum of the temporary bit rates for the programs to a predetermined allowable value, for example, the overall capacity of the line is used to calculate the target bit rates which are assigned to the programs. At this time, the equation for transforming the encoding difficulty of each program to the target bit rate is updated as required in accordance with the acquired encoding difficulty data in such a manner that an average value of the temporary bit rates for the program approaches an average value of target bit rates previous set to the program. Also the encoding difficulty data is processed such that encoding difficulty data about N latest pictures are always converted into encoding difficulty per unit time. Thus, target bit rates based upon the latest state can be assigned even in a state in which the phases of the GOP of the programs are different from one another.

Three steps which are performed by the controller 3 to determine the target bit rates which are assigned to the programs will now be described. The following description also describe a method of controlling an operation for encoding an image according to the present embodiment. In first step, the controller 3 obtains the encoding difficulty per unit time for each of the program in accordance with data of N latest pictures. In the present embodiment, the controller 3 obtains $\Sigma D_{ik}$ of encoding difficulty data of N latest pictures for all of programs obtained by the encoding difficulty calculating portion 42. When the programs $S_i$ code picture j, an average value of the encoding difficulty of N latest pictures is multiplied with picture rate Picture_Rate. Thus, encoding difficulty $DA_i$ converted into a value per second is obtained from the following Equation (3). Note that $\Sigma$ is the sum from k=j to k=j+N−1.

$$DA_i = (\Sigma D_{jk} \times \text{Picture\_Rate})/N \quad (3)$$

The reason why the encoding difficulty $DA_i$ converted into a value per unit time (one second) is obtained is that the target bit rates cannot be determined in accordance with only the sum of the encoding difficulty in GOP units because time required for 1 GOP is sometimes different among programs for performing 2–3 pull-down or the lengths of GOP are sometimes different among the programs.

A second step is performed such that the controller 3 uses equations for transforming the encoding difficulty per unit time into target bit rates for the program. Thus, the controller 3 determines temporary bit rates required by the programs. Specifically, the controller 3 uses encoding difficulty $DA_i$ converted into a value per unit time (one second) so as to determine temporary bit rate Tmp_Rate for each program. The controller 3 updates the equation for transforming the encoding difficulty $DA_i$ into the temporary bit rate Tmp_Rate to a latest equation.

As employed in 2-pass encoding for use to perform authoring (production) of a DVD (Digital Video Disk) or the like, a result of evaluation of the subjective image quality for a human being can be improved in case where the relationship between the encoding difficulty and the bit rates is not made to be a constant proportional relationship, more precisely, where a higher bit rate as compared with the proportional relationship is assigned to a portion having low encoding difficulty and when a lower bit rate as compared with the proportional relationship is assigned to a portion having high encoding difficulty. Therefore, the present embodiment is structured to set the equation for transforming the encoding difficulty into the target bit rate in such a manner that the larger the encoding difficulty is, the larger the target bit rate becomes, and that in a specific range in which the encoding difficulty is larger than an average value thereof, a target bit rate corresponding to the same encoding difficulty is lowered as compared with a case in which the encoding difficulty and the target bit rate have a proportional relationship, whereas in a specific range in which the encoding difficulty is smaller than the average value thereof, the target bit rate corresponding to the same encoding difficulty is raised as compared with a case in which the encoding difficulty and the target bit rate have a proportional relationship.

Figure 4:
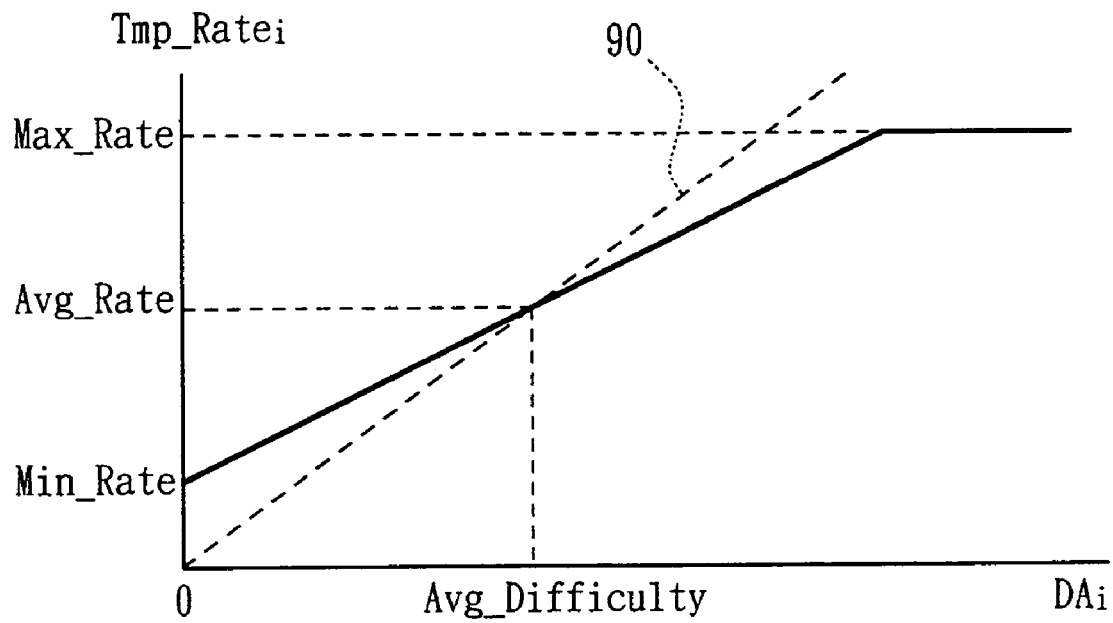
FIG. 4 is a graph showing the relationship between encoding difficulty per unit time and assigned bit rates according to the embodiment of the present invention.

FIG. 4 is a graph showing an example of the relationship according to the above-mentioned requirement between encoding difficulty $DA_i$ converted into a value per unit time and the bit rates to be assigned. In the drawing, the axis of ordinate denotes bit rates to be assigned and the axis of abscissa denotes encoding difficulty $DA_i$ converted into a value per unit time. As shown in FIG. 4, in the present embodiment, the equation for transforming the encoding difficulty $DA_i$ to the target bit rate (in this case, a temporary bit rate) Tmp_Rate$_i$ is arranged in such a manner that the larger the encoding difficulty $DA_i$ is, the larger the target bit rate Tmp_Rate$_i$ becomes, and that in a specific range in which the encoding difficulty $DA_i$ is larger than an average value Avg_Difficulty, the target bit rate Tmp_Rate$_i$ corresponding to the same encoding difficulty $DA_i$ is lowered as compared with a case in which the encoding difficulty $DA_i$ given reference numeral 90 and the target bit rate Tmp_Rate$_i$ have a proportional relationship, whereas in a specific range in which the encoding difficulty $DA_i$ is smaller than an average value Avg_Difficulty, the target bit rate Tmp_Rate$_i$ corresponding to the same encoding difficulty $DA_i$ is raised as compared with a case in which the encoding difficulty $DA_i$ and the target bit rate Tmp_Rate$_i$ have a proportional relationship. In the Figure, Max_Rate, Min_Rate and Avg_Rate represent a highest bit rate, a lowest bit rate and an average bit rate, respectively, set for each program. Note that the sum of the average bit rates set for each program must be lower than the line (transmission path) capacity Total_Rate. In the graph, Avg_Difficulty is an estimated value of average encoding difficulty of an input image material to be encoded. The reason why the estimated value is employed is that an estimation must be performed from a previous result of an encoding because the encoding difficulty of a input image material cannot be known in a case of an application of broadcast in which encoding is infinitely continued. A method of updating Avg_Difficulty will be described later.

As described above, when Max_Rate, Min_Rate, Avg_Rate and Avg_Difficulty are given, the relationship between the encoding difficulty $DA_i$ and the temporary bit rate Tmp_Rate$_i$ to be assigned to an i th program is, in the example shown in FIG. 4, expressed by a straight line which is made to be Min_Rate when encoding difficulty $DA_i$ is zero and which is made to be Avg_Rate when encoding difficulty $DA_i$ is Avg_Difficulty. Moreover, a limitation is set that the bit rate is not higher than the Max_Rate. That is, temporary bit rate Tmp_Rate$_i$ of a program i is determined by the following Equation (4):

$$\text{Tmp\_Rate}_i = \min\{\text{Min\_Rate} + (\text{Avg\_Rate} - \text{Min\_Rate})/\text{Avg\_Difficulty} \times DA_i, \text{Max\_Rate}\} \quad (4)$$

Note that min {x, y} indicates that smaller one is selected from x and y.

Figure 5:
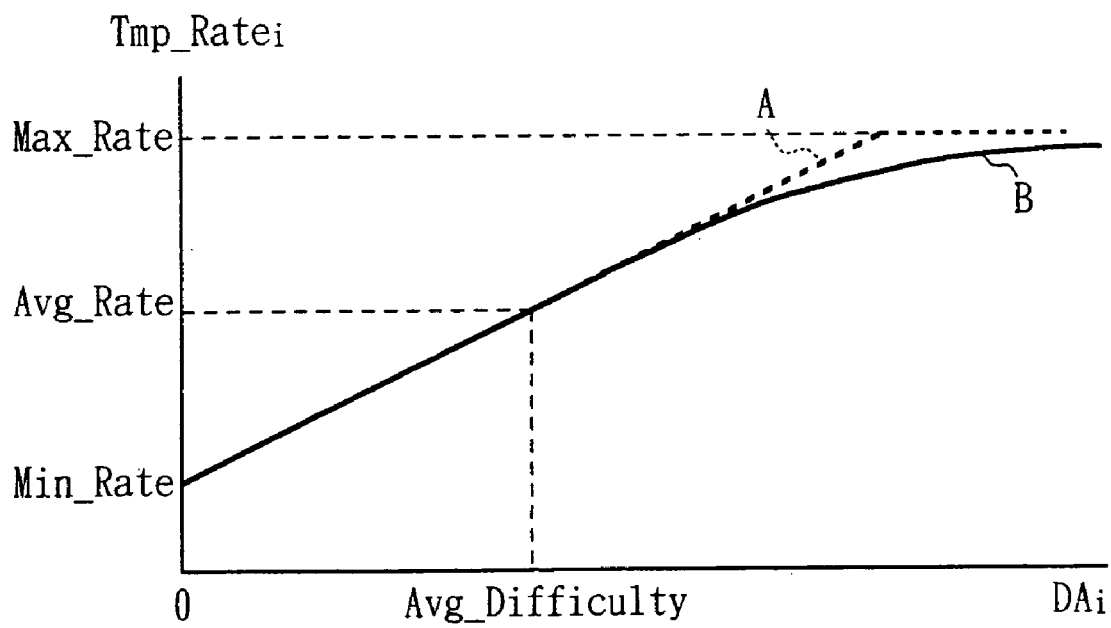
FIG. 5 is a graph showing another relationship between encoding difficulty per unit time and assigned bit rates according to the embodiment of the present invention.

Thus, the controller 3 determines temporary bit rate Tmp_Rate for all of the programs. As an alternative to the straight relationship between the encoding difficulty and the bit rates as indicated by symbol A shown in FIG. 5, a relationship as indicated with symbol B and having a gradient of, for example, an exponential function which is made to be gentle in such a manner that the gradient of change in the bit rate with respect to change in the encoding difficulty is reduced as the encoding difficulty is enlarged in a predetermined range in which the encoding difficulty is larger than the average value of the encoding difficulty.

In step 3, the controller 3 uses the ratio of a sum of the temporary bit rates of all of the programs to the overall line capacity to determine a target bit rate for each program. At this time, the process is performed in such a manner that the target bit rate for each program is in the limitations of the highest bit rate and the lowest bit rate. Initially, the controller 3 obtains the sum Sum_Tmp_Rate of temporary bit rates Tmp_Rate$_1$ to Tmp_Rate$_L$ obtained for all of the programs from the following Equation (5). Note that $\Sigma$ is the sum from k=1 to k=L.

$$\text{Sum\_Tmp\_Rate} = \Sigma \text{Tmp\_Rate}_k \quad (5)$$

Then, the controller 3 compares the sum Sum_Tmp_Rate of the temporary bit rates obtained from Equation (5) with the line capacity Total_Rate to examine whether the sum is higher than the line capacity Total_Rate and whether the sum is greatly lower than the same, and to determine actual target bit rate Target_Rate based upon the result.

If the sum Sum_Tmp_Rate of the temporary bit rates is higher than the line capacity Total_Rate, the sum of the bit rates required by the respective programs is larger than the line capacity so that the final target bit rate Target_Rate required of each program must be lower than the temporary bit rate Tmp_Rate. Therefore, the controller 3 basically determines the target bit rate Target_Ratei for each program by the following Equation (6):

Target_Rate$_i$=Tmp_Rate$_i$×(Total_Rate/Sum_Tmp_Rate)=min{Min_Rate+(Avg_Rate−Min_Rate)/Avg_Difficulty×$DA_i$, Max_Rate}×(Total_Rate/Sum_Tmp_Rate)  (6)

However, if the target bit rate for each program is lowered as described above, there is a possibility that a program lower than the lowest bit rate Min_Rate set for each program exists. Therefore, if a program having the target bit rate Target_Rate$_j$ is lower than the lowest bit rate Min_Rate$_j$ exists, the value of the target bit rate Target_Rate$_i$ of the program is made to be the lowest bit rate Min_Rate$_i$, the bit rate of the program having the lowest bit rate Min_Ratei is subtracted from the line capacity Total_Rate, then a residual bit rate is distributed to the program. At this time, the target bit rate Target_Rate$_i$ of a program i to which the lowest bit rate Min_Rate has not been assigned is expressed by the following Equation (7). Note that Σ Min_Ratek is the sum of the programs in whoch the target bit rate is the lowest bit rate. Moreover, Σ Tmp_Rate$_k$ denotes the sum of the temporary bit rates of the programs to which the lowest bit rate has been assigned.

Target_Rate$_i$=Tmp_Rate$_i$×(Total_Rate−ΣMin_Rate$_k$)//(Sum_Tmp_Rate−ΣTmp_Rate$_k$)  (7)

After the controller 3 distributes the bit rate in accordance with Equation (7), if a program which bit rate is lower than the lowest bit rate Min_Rate newly exists, the controller 3 makes the value of the bit rate of the program to be a lowest bit rate to determine a target bit rate for each of the remaining programs in accordance with Equation (7).

On the other hand, if the sum Sum_Tmp_Rate is not higher than the line capacity Total_Rate, the sum of bit rates required by the respective programs is equal to or less than the line capacity. Therefore, the sum is not larger than the line capacity so that a modification is not necessarily required, however, to realize further improved image quality by effectively using the line capacity, the target bit rate for each program can be set higher than the temporary bit rate. Therefore, according to the present embodiment, the controller 3 basically determines the target bit rate Target_Rate$_i$ for each program in accordance with Equation (6). In this case, target bit rate Target_Rate$_i$ higher than the temporary Tmp_Rate$_i$ can be obtained. However, if the target bit rate for each program is raised, there is a possibility that a program which bit rate is higher than the highest bit rate Max_Rate set for each program exists. Therefore, if a program having the target bit rate Target_Rate$_i$ which is determined in accordance with Equation (6) and which is higher than the highest bit rate Max_Rate$_i$ exists, the value of the bit rate of the program is made to be the highest bit rate Max_Rate$_j$, and the bit rate of the program i which is the highest bit rate Max_Rate$_i$ is subtracted from the line capacity Total_Rate, then a residual bit rate is distributed to the programs. At this time, the target bit rate Target_Rate$_i$ of the program i to which the highest bit rate Max_Rate has not been assigned is determined by the following Equation (8). Note that Σ Max_Rate$_k$ denotes the sum of the program in which the target bit rate is the highest bit rate and Σ Tmp_Rate$_k$ denotes the sum of temporary bit rates of the programs to each of which the highest bit rate has been assigned.

Target_Rate$_i$=Tmp_Rate$_i$×(Total_Rate−ΣMax_Rate$_k$)//(Sum_Tmp_Rate−ΣTmp_Rate$_k$)  (8)

If a program which bit rate is higher than the highest Max_Rate newly exists after the controller 3 has distributed the bit rate in accordance with Equation (8), the bit rate of the program is made to be highest bit rate Max_Rate$_i$ to determine a target bit rate for the remaining programs in accordance with Equation (8).

In the present embodiment, the transformation (6) in which the encoding difficulty for each program is converted to the target bit rate is updated based upon the acquired encoding difficulty in such a manner that an average value of temporary bit rates of the program approaches the average bit rate previously set to the program. Therefore, the controller 3 uses the generated encoding difficulty to update the average encoding difficulty. The parameters for determining the equation of the bit rate with respect to the encoding difficulty of each program are Max_Rate, Min_Rate and Avg_Rate set as initial values and Avg_Difficulty which is a variable. For example, if an average value of the encoding difficulty of an image in a certain period of time is known as in a case of a movie, the known average value can be used, however, the average value of the encoding difficulty cannot be usually known. Therefore, the encoding difficulty $DA_i$ converted into a value per one second is used to update the average encoding difficulty Avg_Difficulty of the input image material to be encoded one time for each GOP. A multiplicity of methods may be employed to obtain Avg_Difficulty, for example, a method may be employed, in which the previous Avg_Difficulty is weighted to obtain an average with latest encoding difficulty $DA_i$. In the this case, the average encoding difficulty Avg_Difficulty can be obtained from the following Equation (9):

Avg_Difficulty={(w−1)×Avg_Difficulty'+$DA_i$}/w  (9)

where Avg_Difficulty' denotes an average encoding difficulty of results of previous calculations and w denotes a weighting coefficient to be a sufficiently large integer (for example, 256). The weighting coefficient w corresponds to a time constant of change in the average value of the encoding difficulty, the larger the weighting coefficient w is, the less the change in the average value is, however, it is preferable that the weighting coefficient w is set in accordance with the application since time is required to approach an average value of the actual encoding difficulty.

A value obtained statistically is employed as the initial value of Avg_Difficulty. For example, a value is set which is estimated as average encoding difficulty of input material in accordance with the conditions (resolution, whether or not pull-down exists and the like) under which an input image is encoded and the type of the input image (a movie, video, sports, news and the like). In a case of an image material, the compression efficiency can be improved by dint of 2–3 pull-down and frame DCT, therefore, the average value of the encoding difficulty is usually considerably smaller than that of a video material so as to set a small value as the initial value of the Avg_Difficulty.

Figure 6:
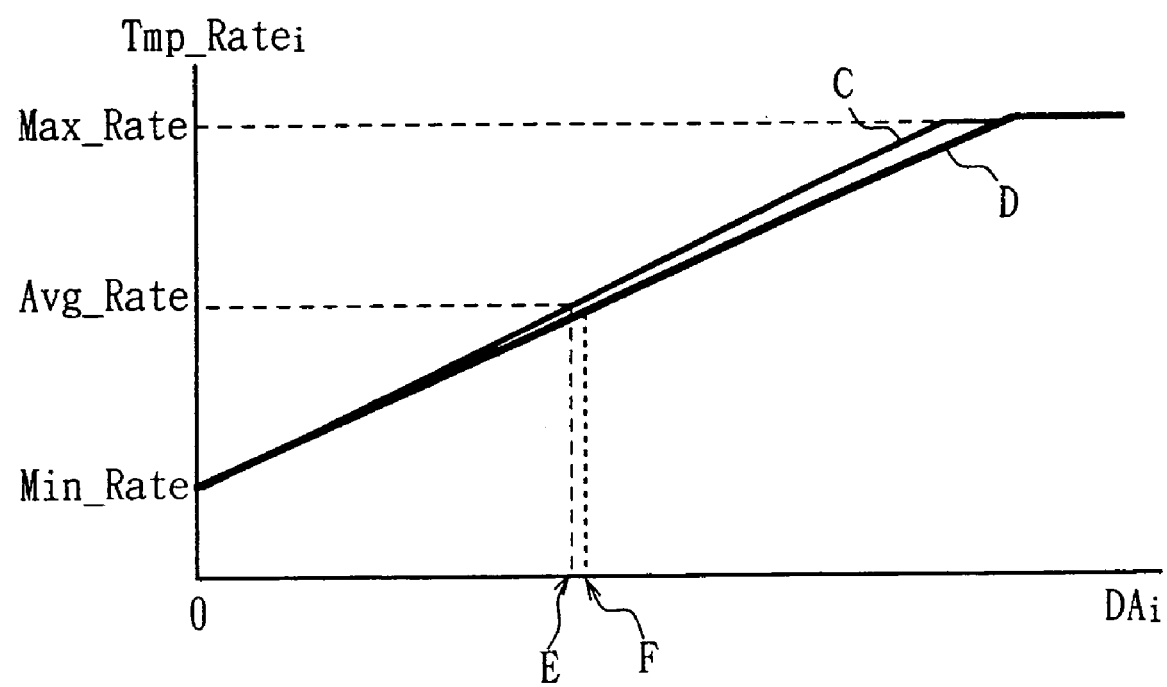
FIG. 6 is a graph showing changes in the relationship between encoding difficulty per unit time and assigned bit rates when an estimated value of average encoding difficulty has been updated according to the embodiment of the present invention.

As described above, when Avg_Difficulty has been obtained, the Equation (4) for calculating a temporary target bit rate is updated. FIG. 6 is a graph showing an example of change in the relationship between the encoding difficulty and the bit rate after the Avg_Difficulty has been updated. In FIG. 6, symbol C indicates the correspondence relationship based upon average encoding difficulty E (Avg_Difficulty')

before updating, symbol D indicates the correspondence relationship based upon average encoding difficulty F after updating has been completed. When the encoding difficulty has been updated as shown in FIG. 6, the transformation for obtaining a temporary bit rate from the encoding difficulty is somewhat changed, as a result, correction is performed such that encoding can be performed within a range of the overall quantity of target codes is permitted. For example, in the example shown in FIG. 6, the latest encoding difficulty is considerably larger than the average Avg_Difficulty so that the encoding difficulty is updated in such a manner that Avg_Difficulty is enlarged, as a result, the gradient of the transforming equation is made to be gentle.

The operation of the statistical multiplexing system 1 shown in FIG. 1 will be described. In the statistical multiplexing system 1, the programs $S_i$ are encoded by the image encoders $2_i$, respectively. Each of the image encoders $2_i$ outputs, to the controller 3, encoding difficulty $D_i$ for each of the programs $S_i$, indicating encoding difficulty in encoding an image to be encoded. The controller 3 uses the statistical multiplexing technique to determine Target_Rate$_i$ which is a target bit rate as a target encoding rate which is a target amount of generation of codes per unit time for each programs Si and set the target bit rate Target_Rate$_i$ to each of the image encoders $2_i$. The image encoders $2_i$ compression-code the programs $S_i$ based upon the set target bit rate Target_Rate$_i$ so as to output compression-encoded data $St_i$ to the multiplexer 4. The multiplexer 4 multiplexes the input compression-encoded data $St_i$ to generate image $S_m$ to be output, and then outputs to the transmission path.

The operations of the image encoders $2_i$ shown in FIG. 2 will now be described. The programs $S_i$ are input to the encoder control unit 11 of each of the image encoders $2_i$. In the encoder control unit 11, the image rearranging circuit 21 rearranges the order of the pictures (I picture, P picture and B picture) in accordance with an encoding order. Then, the scan-conversion/macroblocking circuit 22 determines whether the structure is the frame structure or the field structure, followed by performing scan conversion and a process for forming a macroblock in accordance with a result of the determination. If the picture is the I picture, the statistic calculating circuit 23 calculates intra-AC to transmit statistics data $Sa_i$ to the encoding difficulty calculating portion 42 of the encoding control portion 15. Output data of the scan-conversion/macroblocking circuit 22 is allowed to pass through the statistic calculating circuit 23 to be transmitted to the FIFO memory 12 and the movement detecting circuit 14.

The FIFO memory 12 delays input image data by a period of time required for the encoding difficulty calculating portion 42 to calculate the encoding difficulty of N pictures following the encoded picture so as to output delayed image data to the encoder 13. The movement detecting circuit 14 detects a movement vector to transmit the movement vector to the movement compensation circuit 39 and transmit ME residual data $Sz_i$ to the ME residual calculating portion 41 of the encoding control portion 15.

If the picture is the I picture, in the encoder 13 does the subtraction circuit 31 does not obtain the difference of predictive image data. Output data of the FIFO memory 12 is, as it is, input to the DCT circuit 32 so as to be subjected to DCT. Then, the quantizing circuit 33 quantizes a DCT coefficient, the variable-length encoding circuit 34 converts data of the quantizing circuit 33 into a variable-length code. Output data of the variable-length encoding circuit 34 is temporarily stored in the buffer memory 35 so as to be output as compression-encoded data $St_i$ composed of bit streams. The inverse-quantizing circuit 36 inversely quantizes output data of the quantizing circuit 33, the inverse-DCT circuit 37 subjects output data of the inverse-quantizing circuit 36 to inverse DCT, output image data of the inverse-DCT circuit 37 is input and stores in the movement compensation circuit 39 through the addition circuit 38.

If the picture is the P picture, in the encoder 13, the movement compensation circuit 39 generates predictive image data based upon stored image data corresponding to the previous I picture or P picture and the movement vector of the movement detecting circuit 14 to output to the subtraction circuit 31 and the addition circuit 38. The subtraction circuit 31 obtains the difference between output data of the FIFO memory 12 and predictive image data of the movement compensation circuit 39. The DCT circuit 32 performs DCT, the quantizing circuit 33 quantizes a DCT coefficient, the variable-length encoding circuit 34 converts data of the quantizing circuit 33 into a variable-length code, output data of the variable-length encoding circuit 34 is temporarily stored in the buffer memory 35 so as to be output as compression-encoded data $St_i$. The inverse-quantizing circuit 36 inversely quantizes output data of the quantizing circuit 33. The inverse-DCT circuit 37 subjects data of the inverse-quantizing circuit 36 to inverse DCT, the addition circuit 38 adds output data of the inverse-DCT circuit 37 and predictive image data so as to input a result of the addition to the movement compensation circuit 39 so as to be stored.

If the picture is the B picture, in the encoder 13, the movement compensation circuit 39 generates predictive image data based upon two image data corresponding to stored previous and future I picture or P picture and two movement vectors of the movement detecting circuit 14 to output to the subtraction circuit 31 and the addition circuit 38. The subtraction circuit 31 obtains the difference between output data of the FIFO memory 12 and predictive image data of the movement compensation circuit 39. The DCT circuit 32 performs DCT. The quantizing circuit 33 quantizes a DCT coefficient. The variable-length encoding circuit 34 converts data of the quantizing circuit 33 into a variable-length code. Output data of the variable-length encoding circuit 34 is temporarily stored in the buffer memory 35 so as to be output as compression-encoded data $St_i$. Note that the B picture is not stored in the movement compensation circuit 39.

Referring to flow charts shown in FIGS. 7 to 9, the operations of the encoding control portion 15 of the image encoder 2 and the controller 3 will be described. In the operations, the controller 3 sets the total line capacity Total_Rate (step S101). Then, the controller 3 sets encoding conditions including highest bit rate Max_Rate, lowest bit rate Min_Rate, average bit rate Avg_Rate, resolution and pull-down (step S102). In accordance with the encoding conditions, the controller 3 sets an initial value of average encoding difficulty Avg_Difficulty to all of the programs (step S103). A processing for each frame is started. That is, the encoding difficulty calculating portion 42 of the encoding control portion 15 obtains encoding difficulty $D_i$ for pictures j+N−1 of all of the programs based upon the ME residual and the like so as to be stored (step S104). Then, the controller 3 obtains encoding difficulty $DA_i$ converted into a value per unit time (one second) of all of the programs in accordance with Equation (3) based upon encoding difficulty of N latest pictures obtained by the encoding difficulty calculating portion 42 (step S105). Then, the controller 3 uses the encoding difficulty $DA_i$ to determine temporary bit rate Tmp_Rate of each program in accordance with Equation (4) (step S106). Then, the controller 3 obtains the sum Sum_Tmp_Rate of temporary bit rate Tmp_Rate1 to Tmp_Rate$_L$ obtained for all of the programs in accordance with Equation (5) (step S107).

Then, the controller 3 determines whether or not the sum Sum_Tmp_Rate of the temporary bit rates is higher than the line capacity Total_Rate (step S108). If the sum Sum_Tmp_Rate of the temporary bit rates is higher than the line capacity Total_Rate (step S108; Y), the controller 3 modifies the temporary bit rate Tmp_Rate so as to determine target bit rate Target_Rate for each of the programs. Specifically, target bit rate Target_Rate for each program is calculated in accordance with Equation (6) (step S109). Then, it is determined whether or not a program lower than the lowest bit rate Min_Rate exists (step S110). If a program lower than the lowest bit rate Min_Rate exists (step S110; Y), the value of the bit rate of the program is set as lowest bit rate Min_Rate (step S111). Then, the operation of the controller 3 is returned to step S109 so that the bit rate Target_Rate$_i$ of the program to which the lowest bit rate Min_Rate is not assigned is obtained in accordance with Equation (7) so as to be distributed to the programs (step S109). If no program lower than the lowest bit rate Min_Rate exists (step S110; N), the controller 3 sets target bit rate Target_Rate$_i$ to the quantization-index determining portion 45 of all of the image encoders 2$_i$ (step S115).

On the other hand, in a case where the sum Sum_Tmp_Rate of the temporary bit rates is not higher than the line capacity Total_Rate (step S108; N), the temporary bit rate Tmp_Rate is modified so that target bit rate Target_Rate for each program is determined. Specifically, target bit rate of each program is calculated in accordance with Equation (6) (step S112). Then, it is determined whether or not a program higher than the highest bit rate Max_Rate exists (step S113). If a program higher than the highest bit rate Max_Rate exists (step S113; Y), the value of the bit rate of the program is set as the highest bit rate Max_Rate (step S114). Then, the operation of the controller 3 is returned to step S112 so that target bit rate Target_Rate$_i$ of the program to which the highest bit rate Max_Rate is not assigned is obtained in accordance with Equation (8) so as to be distributed to the programs (step S112). If no program higher than the highest bit rate Max_Rate exists (step S113; N), the controller 3 sets target bit rate Target_Rate$_i$ to the quantization-index determining portion 45 of all of the image encoders 2$_i$ (step S115).

Then, the quantization-index determining portion 45 determines quantization index corresponding to the quantization characteristic value in the quantizing circuit 33 in such a manner that target bit rate Target_Rate$_i$ set by the controller 3 is realized so as to transmit to the quantizing circuit 33. In response to this, encoding of pictures i is performed (step S116). Note that picture j denotes a picture which will be encoded.

After the picture j has been encoded, j+1 is made to be new j to processing of a next picture (step S117), average encoding difficulty Avg_Difficulty for only a program having the picture j which is the final frame of GOP is updated by using the generated encoding difficulty in accordance with Equation (9) (step S118).

Then, it is determined whether or not encoding of the picture j is completed (step S119). If encoding is continued (step S119; N), the operation returns to step S104. If encoding is completed (step S119; Y), the operations shown in FIGS. 7 to 9 are completed.

As described above, according to the present embodiment, based upon the correspondence relationship between the encoding difficulty and the target bit rate set for each program, a temporary bit rate corresponding to the encoding difficulty for each program is calculated. If the target bit rate obtained in accordance with the ratio of the sum of the temporary bit rate and the overall line capacity does not satisfy the highest or lowest bit rate for each program, the bit rate is limited to the highest or the lowest bit rate. The bit rate limited to the lowest or highest bit rate is subtracted from the sum of the temporary bit rates so that a remaining bit rate is distributed to each program. Therefore, a subjectively optimum picture for a human being can be realized, target bit rates can be assigned to correspond to setting of the average bit rate, the highest bit rate or the lowest bit rate required to operate a broadcast station.

In the present embodiment, an estimated value of the average encoding difficulty is updated for each GOP, and the transformation for obtaining the target bit rate from the encoding difficulty is changed so that optimum bit rates can always be assigned.

Further, in the present embodiment, the target bit rate are obtained as data used for calculating target bit rate in such manner that the latest N encoding difficulty data are always converted into encoding difficulty per unit time. Therefore, even if the phases of GOP of the programs are not the same, optimum target bit rates based upon the latest state can be distributed.

Figure 7:
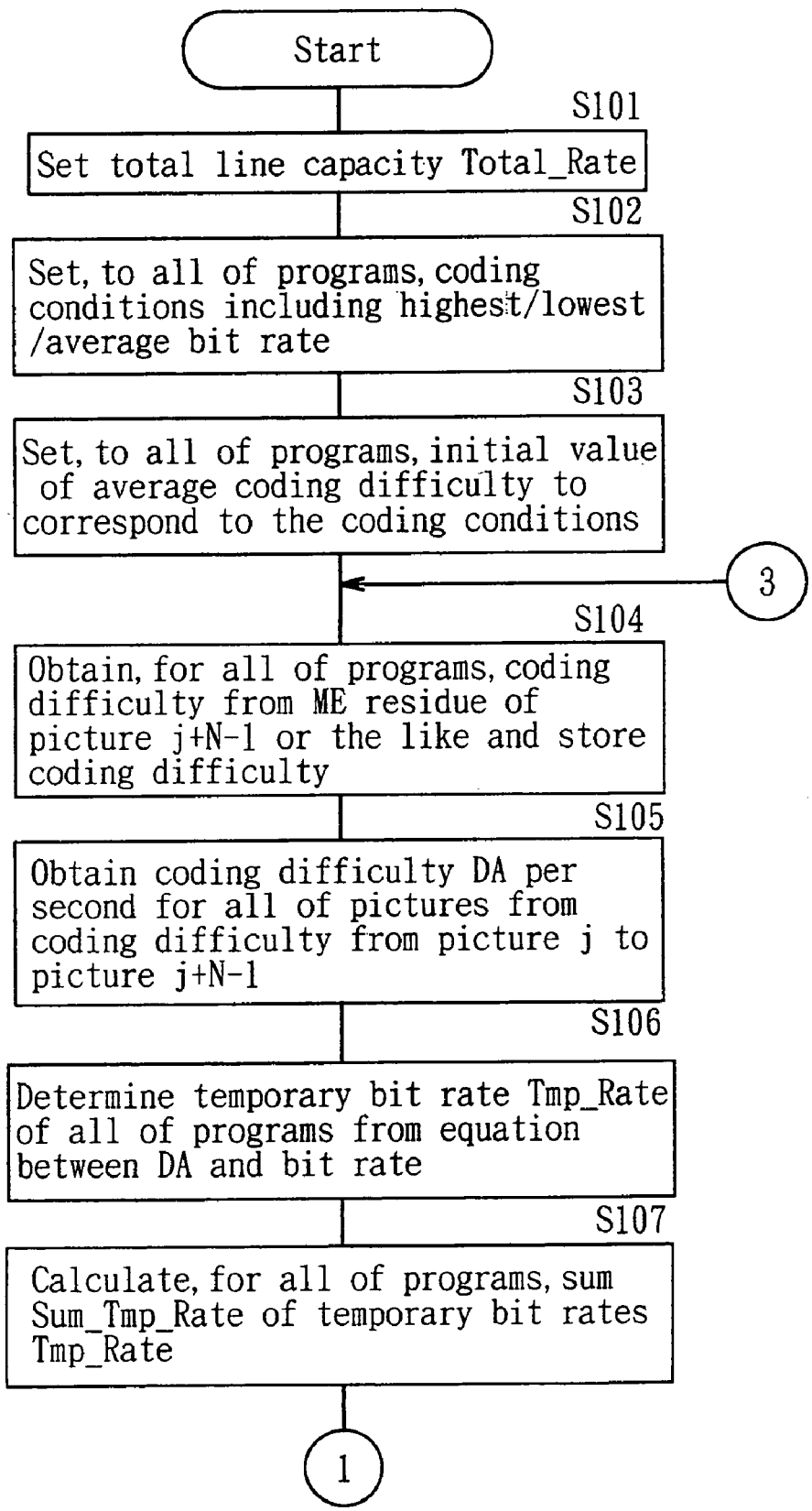
FIG. 7 is a flow chart showing an operation for assigning target bit rates to the respective programs according to the embodiment of the present invention.
Figure 8:
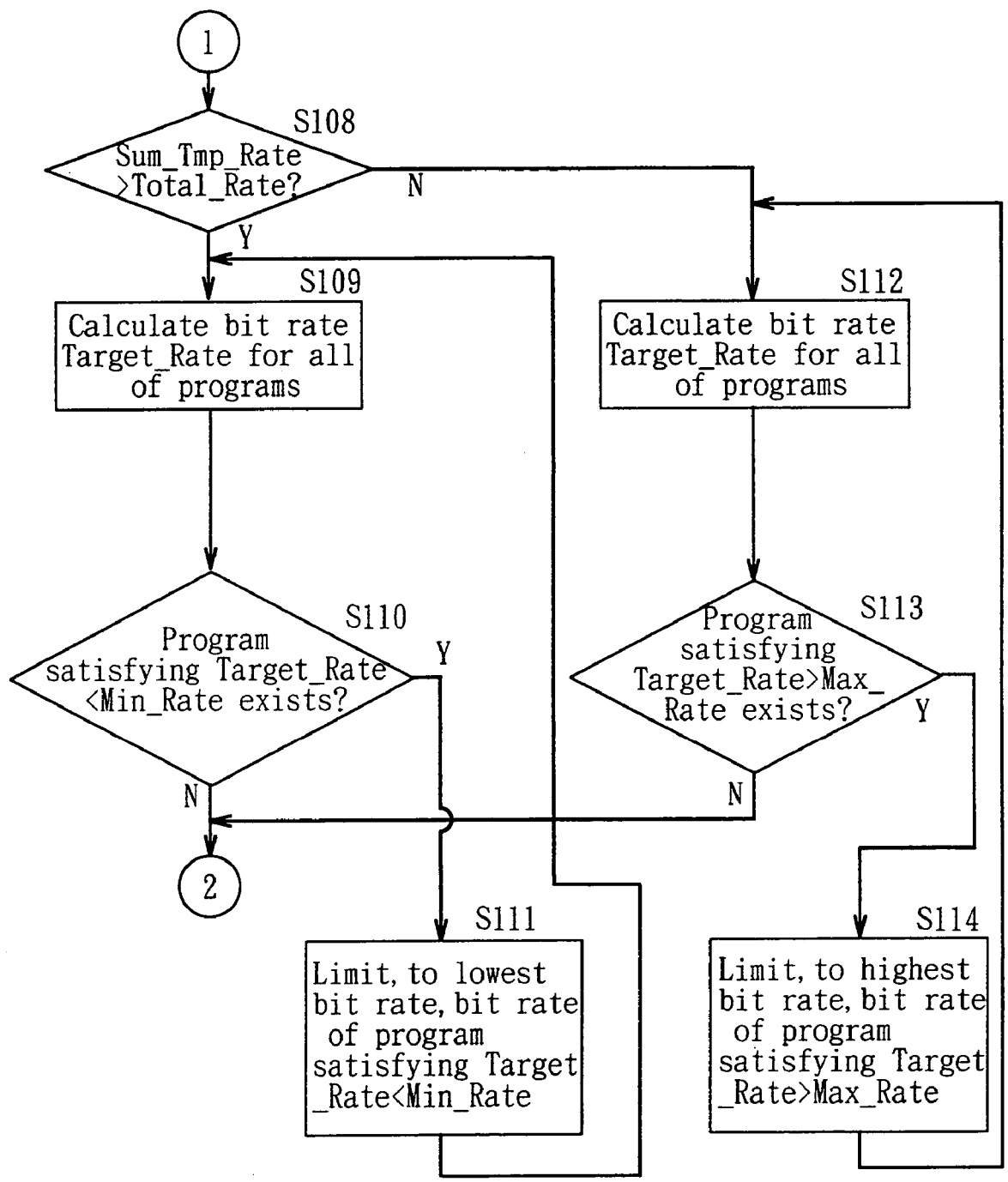
FIG. 8 is a flow chart showing the operation continued from FIG. 7.
Figure 9:
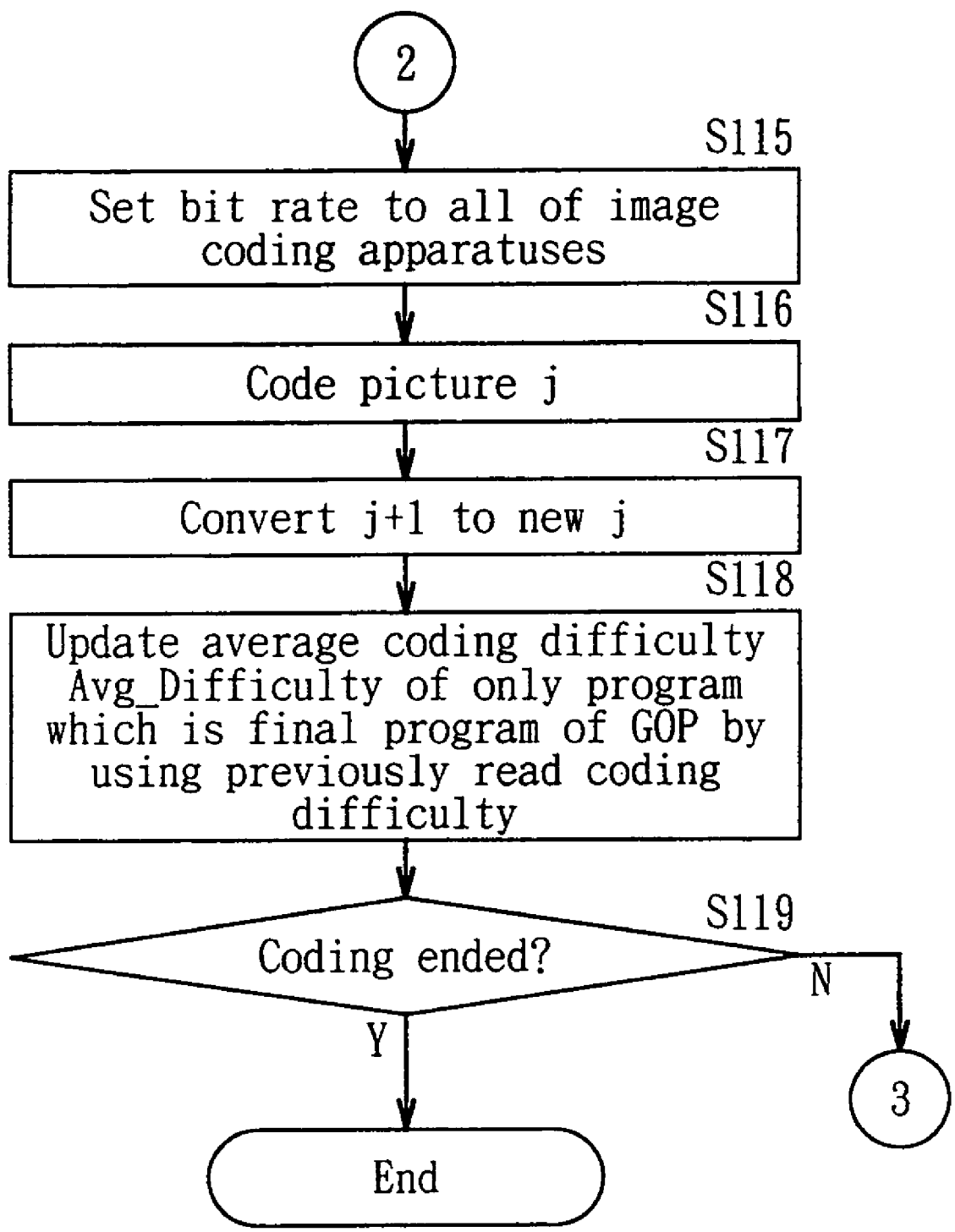
FIG. 9 is a flow chart showing the operation continued from FIG. 8.
Figure 10:
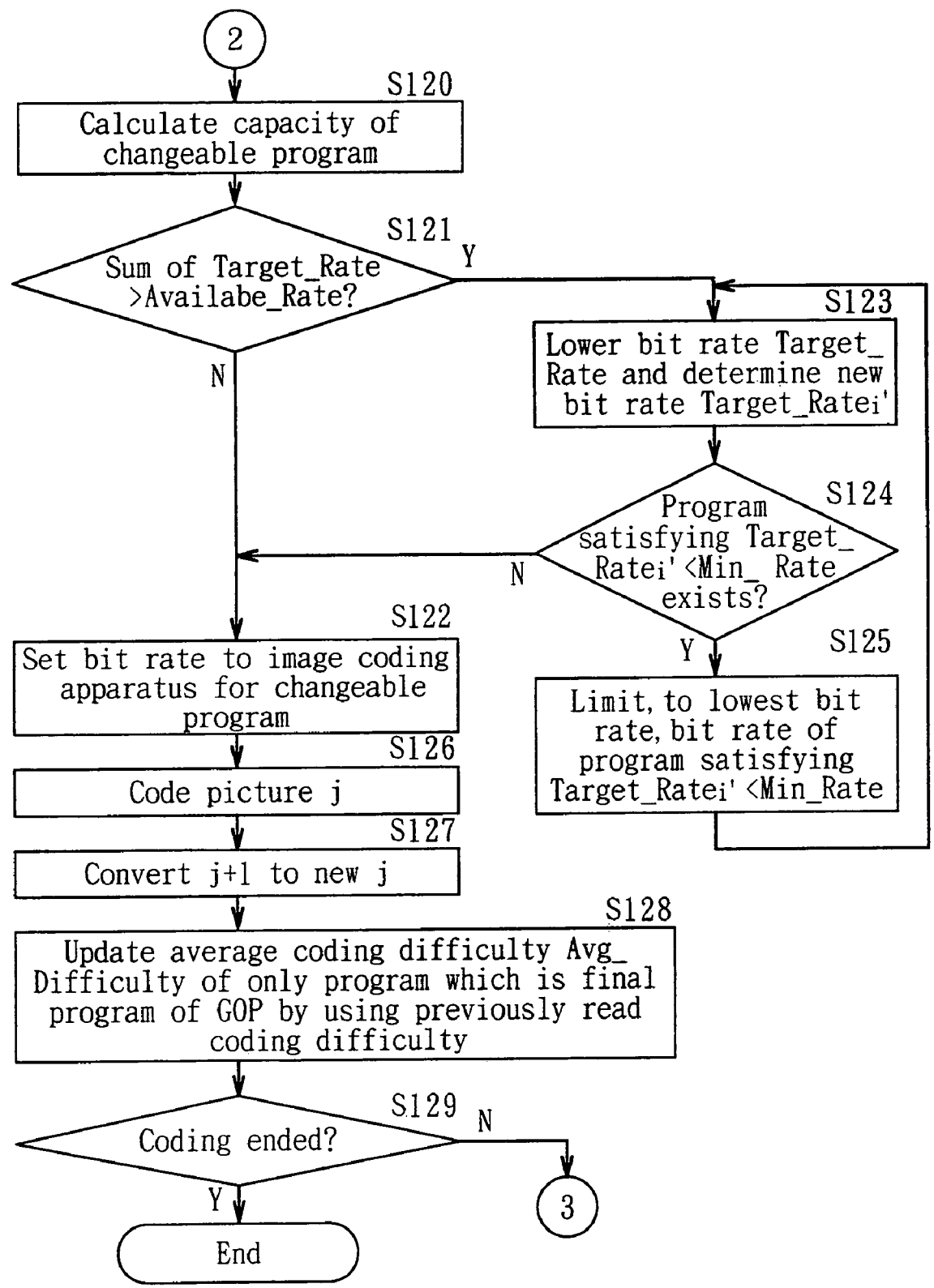
FIG. 10 is a flow chart showing the operation of an example of a modification according to the embodiment of the present invention.

Referring to FIGS. 7, 8 and 10, an example of a modification of the present embodiment will be described in which an image encoder using rate control in GOP units difined in TM5 or the like is employed and change in the target bit rate is limited in GOP unit. The same elements as those in the above embodiment are given the same reference numerals and the description is omitted. The operation (see FIGS. 7 and 8) to be performed to a branched point ② shown in FIG. 8 is the same as the above embodiment.

If change in the target bit rate is limited in GOP units, the target bit rates can simultaneously be changed if the phases of the GOP for all of the programs are the same, however, since a program in which, for example, 2–3 pull-down is performed is mixed actually, the phases of the GOP are deviated. In such a case, contrivance to give a priority to a program for lowering the target bit rate is required in order to prevent exceeding the line capacity.

In this modification, a process which is performed until a target bit rate which satisfies a lowest and highest bit rates is, in frame units, determined for all of the programs (step S110; N and step S113; N) is the same as that in the above embodiment. In this modification, after the target bit rate Target_Rate$_j$ is determined, a capacity Availabe_Rate of bit rate which can be assigned to the programs in which the target bit rates of which can be changed, is obtained in accordance with the following Equation (10) since programs of L programs having the target bit rates which can be changed at the boundary of the GOP and programs having the target bit rates which cannot be changed at the boundary of the GOP exist. Note that Σ Target_Rate$_k$ denotes the sum of target bit rates of a program having the target bit rate which cannot be change at the boundary of the GOP.

$$\text{Availabe\_Rate} = \text{Total\_Rate} - \Sigma \text{ Target\_Rate}_k \quad (10)$$

Then, it is determined whether or not the sum of target bit rates Target_Rate of the program in which the target bit rate can be changed is higher than Availabe_Rate (step S121). If the sum of the target bit rate Target_Rate is not higher than Availabe_Rate (step S121; N), even if the target bit rate Target_Rate may be set as it is, the sum is not larger than the line capacity so that the target bit rate Target_Rate is set to the quantization-index determining portion 45 of the encoding control portion 15 of each image encoders $2_i$ for the programs in which the target bit rates can be changed (step S122). At this time, there is an excess of the line capacity and the excess capacity is used to raise the bit rate when a program including complicated pictures.

If the sum of the target bit rate Target_Rate is higher than the Availabe_Rate (step S121; Y), the sum exceeds the line capacity so that the target bit rate Target_Rate is lowered in accordance with the following Equation (11) to prevent exceeding Availabe_Rate, a new bit rate Target_Rate$_i$' is determined (step S123). Note that $\Sigma$ Target_Rate$_k$ denotes the sum of target bit rates Target_Rate of the programs in which the target bit rates can be changed.

$$\text{Target\_Rate}_i' = \text{Target\_Rate}_i \times (\text{Availabe\_Rate}/\Sigma \text{ Target\_Rate}_k) \quad (11)$$

Then, it is determined whether or not a program having the newly determined target bit rate Target_Rate$_i$' which is lower than the lowest bit rate Min_Rate exists (step S124). If a program lower than the lowest bit rate Min_Rate exists (step S124; Y), the value of the bit rate of the program is made to be the lowest bit rate Min_Rate (step S125). Then, the operation is returned to step S123 so that the bit rates of the programs, to which the lowest bit rate Min_Rate is not assigned, are distributed to the programs in accordance with Equation (11) (step S123). If no program lower than the lowest bit rate Min_Rate exists (step S124; N), the controller 3 sets the target bit rate Target_Rate to the quantization-index determining portion 45 of the encoding control portion 15 of each of the image encoders $2_i$ of a program in which the target bit rates can be changed (step S122). Steps S126 to S129 which must be performed after target bit rate Target_Rate$_i$' has been set are similar to steps S116 and S119 shown in FIG. 8.

According to the present modification, even if the target bit rate can be changed only in GOP units and the phases of the GOP are deviated, the target bit rates are assigned to correspond to setting of the latest encoding difficulty, the highest bit rate or lowest bit rate of each program in which the target bit rate can be changed at the boundary of the GOP in order not to exceed the capacity of the changeable program. Therefore, prevention from exceeding the line capacity can always be achieved, and the subjective image quality, to which the visible characteristic of a human being is reflected, can significantly be improved.

Figure 11:
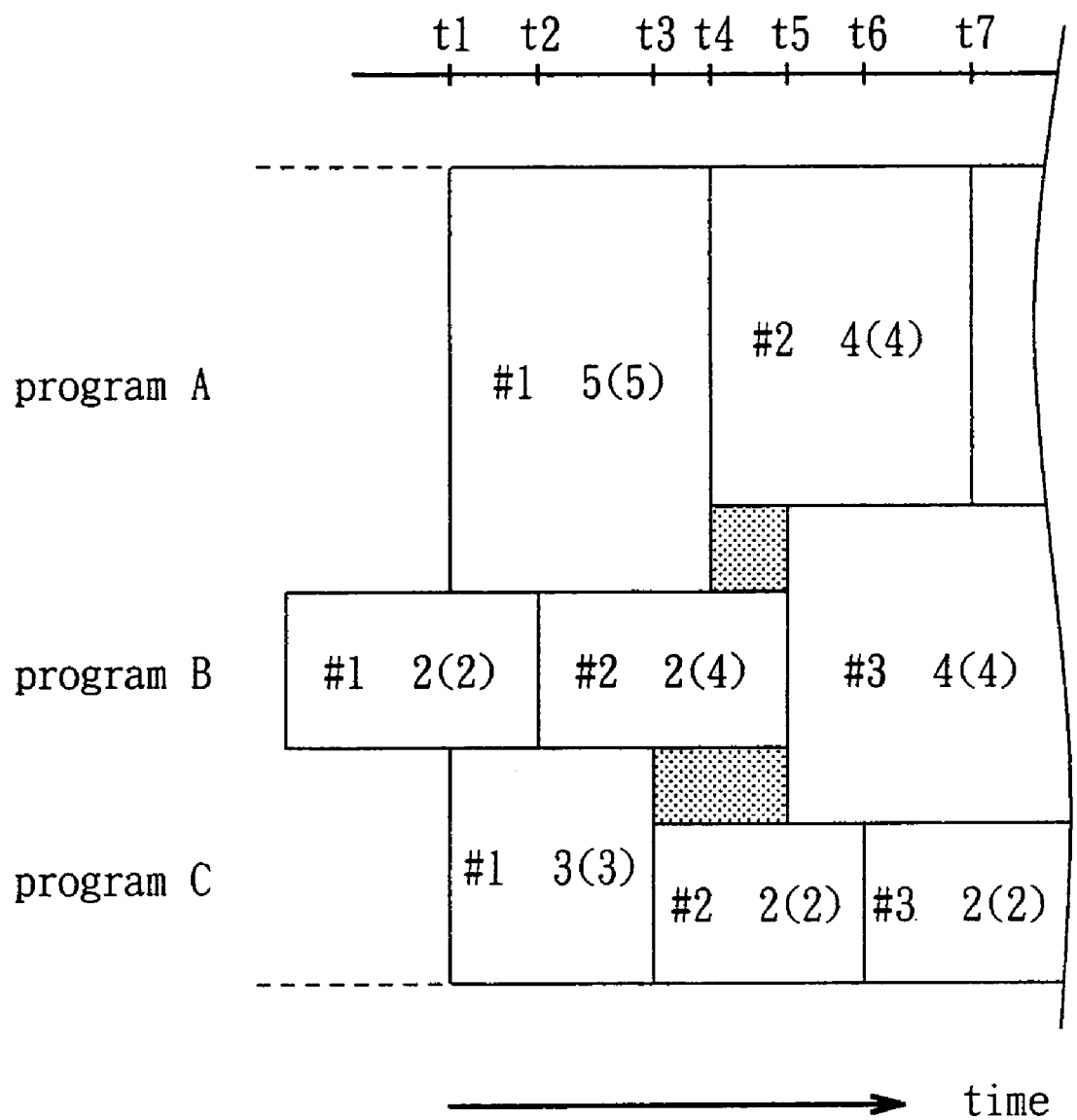
FIG. 11 is a diagram showing an example of an operation for assigning target bit rates to the respective programs in an example of the modification according to the embodiment of the present invention.
Figure 12:
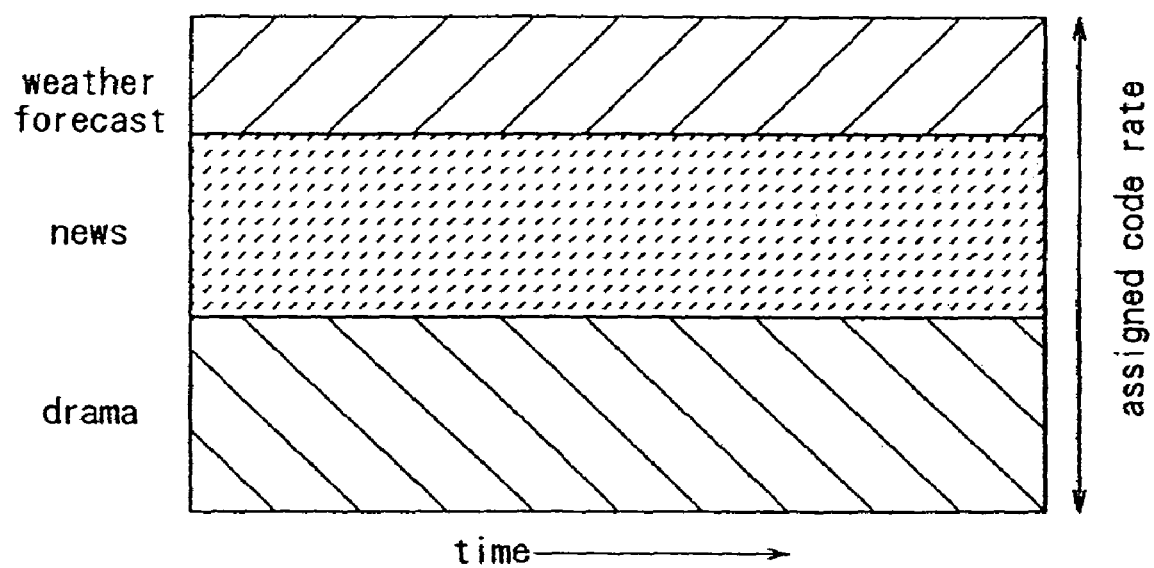
FIG. 12 is a diagram showing assigned code rates to the respective programs when multiplexing has been performed with a conventional fixed rate.
Figure 13:
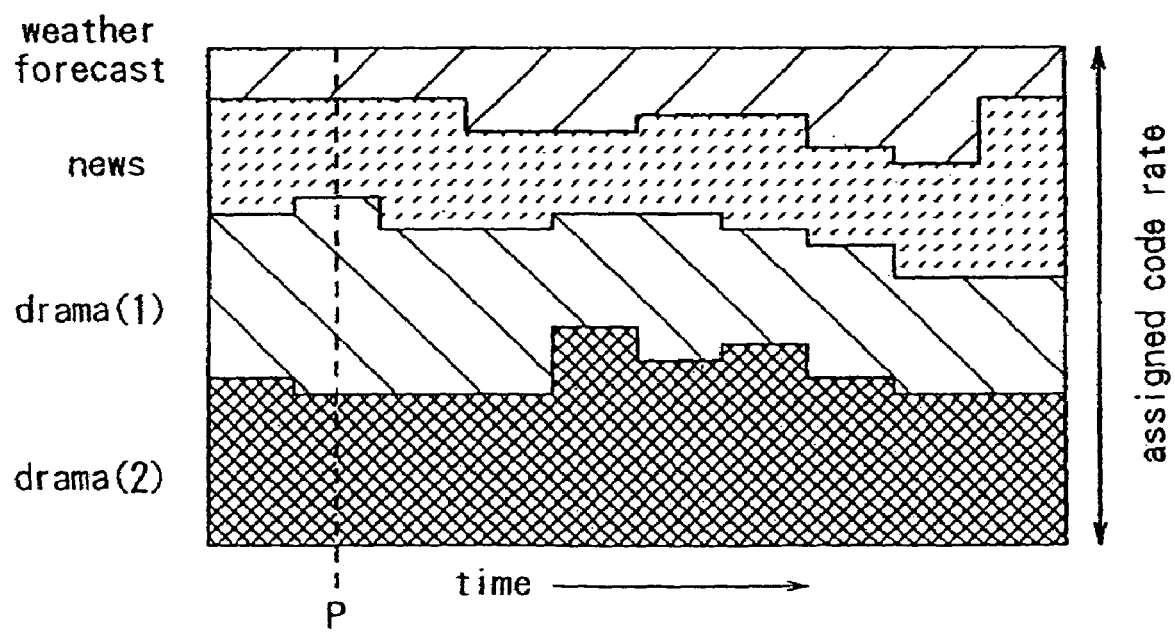
FIG. 13 is a diagram showing assigned code rates to the respective programs when the multiplexing has been performed by dynamically changing the conventional code rate.

FIG. 11 is a diagram showing an example of an operation according to the present modification for assigning target bit rates to each program. Axis of ordinate of the graph denotes target bit rates assigned to the programs and axis of abscissa denotes time. Note that the total bit rate is 10 Mbps (megabits per second).

In the example shown in FIG. 11, the target bit rates are assigned to three programs A to C based upon the modification. In the drawing, #1, #2, . . . , denote the numbers of GOP. In the drawing, parenthesized numerals denote target bit rate Target_Rate$_i$ in Equation 11, numerals on the left side of the parenthesis denote target bit rate Target_Rate$_i$' in Equation 11. The unit of the bit rate is Mbps. In the drawing, t1 denotes time at which GOP #1 of the program A is started, t2 denotes time at GOP #2 of the program B is started, t3 denotes time at which GOP #2 of the program C is started, time t4 denotes time at which GOP #2 of the program A is started, t5 denotes time at which GOP #3 of the program B is started, t6 denotes time at which GOP #3 of the program C is started and t7 denotes time at which GOP #3 of the program A is started.

In the present modification, at time t2 at which GOP #2 of the program B is started, target bit rate Target_Rate$_i$ of the program B in which the target bit rate can be changed is 4 Mbps. However, at time t2, the bit rate capacity Availabe_Rate which can be assigned to the program B in which the target bit rate can be changed is 2 Mbps. Therefore, new target bit rate Target_Rate$_i$' of program B is set to be 4×(2/4), that is, 2 Mbps in accordance with Equation (11).

Note that the present invention is not limited to the above embodiments. For example, the correspondence relationship between the encoding difficulty for each program and the target bit rate is not limited to the embodiment and may be arbitrarily set. A method may arbitrarily be employed in which a temporary bit rate is modified to calculate a final target bit rate.

As described above, the correspondence between the encoding difficulty set for each program data and the target code rate is used to determine a temporary target code rate for each program data corresponding to the obtained encoding difficulty for each program. The temporary target code rate is modified in such a manner that the sum of the target code rates for each program data is within a specific allowable value so as to determine a final target code rate for each program data. Therefore, a subjectively optimum picture for a human being can be realized by using the statistical multiplexing technique while a predetermined allowable value is satisfied. Moreover, an effect can be obtained in that target code rates corresponding to setting of, for example, a maximum value, a minimum value and an average value of the target code rate and suitable for each program data can be assigned.

According to the present invention, a target code rate corresponding to setting of an average value of a predetermined target code rate can be assigned to each program data. As a result, an effect can be obtained in that accurate billing corresponding to a budget can be performed.

According to the present invention, the encoding means determines a temporary target code rate in image units if the target code rate can be changed in units of a plurality of images. To cause the sum of the target code rates for each of the program data to satisfy a predetermined allowable value range, the temporary target code rate of only a encoding means in which the target code rate can be changed is modified so as to determine a final target code rate. Therefore, even if the target code rate can be changed in only units of a plurality of images, a subjectively optimum picture for a human being can be realized while a predetermined allowable value is satisfied. Moreover, an effect can be obtained in that target code rates corresponding to setting of, for example, a maximum value, a minimum value and an average value of the target code rate and suitable for each program data can be assigned.

According to the above description, the various embodiments or modification according to the present invention, therefore, in a range of the following claim, the present invention can be performed in other manner than that description above in detail.

What is claimed is:

1. An encoding system for encoding a plurality of program data each of which includes image data to multiplex encoded program data, the encoding system comprising:

a plurality of encoding difficulty detecting means for detecting, for each program data, encoding difficulty indicating encoding difficulty in encoding when image data included in each program data is encoded;

a plurality of encoding means each of which codes image data included in each program data based upon a input target code rate which is a target amount of codes which must be generated per unit time;

multiplexing means for multiplexing data encoded by the encoding means; and control means for calculating, for each program data, a temporary target code rate for each program data from the encoding difficulty detected by the encoding difficulty detecting means, calculating a target code rate for each program from the temporary target code rate in such a manner that the sum of the temporary target code rates calculated for each program data is within a specific allowable range and inputting the calculated target code rate to each encoding means for each program data, wherein a corresponding relationship between the encoding difficulty and the target code rate is set in such a manner that the larger the encoding difficulty is, the larger the target code rate becomes, and that in a specific range in which the encoding difficulty is larger than an average value of the encoding difficulty, a target code rate corresponding to the same encoding difficulty is lowered as compared with a case in which the encoding difficulty and the target code rate have a proportional relationship, whereas in a specific range in which the encoding difficulty is smaller than the average value of the encoding difficulty, the target code rate corresponding to the same encoding difficulty is raised as compared with a case in which the encoding difficulty and the target code rate have a proportional relationship.

2. An encoding system according to claim 1 wherein the control means calculates the temporary target code rate for each program data from the encoding difficulty detected by each of the encoding difficulty detecting means based upon an equation individually set for each program data and applied for calculating the temporary target code rate from the encoding difficulty.

3. An encoding system according to claim 2 wherein the equation is determined based upon an average value of the target code rate previously determined for each program data.

4. An encoding system according to claim 2 wherein the equation is determined based upon an average value of the encoding difficulty for each program data.

5. An encoding system according to claim 4 wherein the average value of the encoding difficulty is updated in accordance with a result of encoding.

6. An encoding system according to claim 2 wherein the equation defines a maximum value and a minimum value of the target code rate for each program data.

7. A transmission system for encoding a plurality of program data each of which includes image data, multiplexing encoded program data and transmitting, as transmission data, encoded data, the transmission system comprising:

a plurality of encoding difficulty detecting means for detecting, for each program data, encoding difficulty indicating encoding difficulty in encoding when image data included in each program data is encoded;

a plurality of encoding means for encoding image data included in each program data based upon a input target code rate which is a target amount of codes which must be generated per unit time;

multiplexing means for multiplexing data encoded by each encoding means to transmit multiplexed data as transmission data; and control means for calculating a temporary target code rate for each program data from the encoding difficulty detected by the encoding difficulty detecting means, calculating a target code rate for each program from the temporary target code rate in such a manner that the sum of the temporary target code rates calculated for each program data is in a specific allowable range and inputting the calculated target code rate to each encoding means for each program data, wherein a corresponding relationship between the encoding difficulty and the target code rate is set in such a manner that the larger the encoding difficulty is, the larger the target code rate becomes, and that in a specific range in which the encoding difficulty is larger than an average value of the encoding difficulty, a target code rate corresponding to the same encoding difficulty is lowered as compared with a case in which the encoding difficulty and the target code rate have a proportional relationship, whereas in a specific range in which the encoding difficulty is smaller than the average value of the encoding difficulty, the target code rate corresponding to the same encoding difficulty is raised as compared with a case in which the encoding difficulty and the target code rate have a proportional relationship.

8. A broadcast system for encoding a plurality of program data each of which includes image data, multiplexing encoded data and transmitting, as broadcast data, encoded data, the broadcast system comprising:

a plurality of encoding difficulty detecting means for detecting, for each program data, encoding difficulty indicating encoding difficulty in encoding when image data included in each program data is encoded;

a plurality of encoding means for encoding image data included in each program data based upon a input target code rate which is a target amount of codes which must be generated per unit time;

multiplexing means for multiplexing data encoded by each encoding means to transmit multiplexed data as broadcast data; and control means for calculating a temporary target code rate for each program data from the encoding difficulty detected by the encoding difficulty detecting means, calculating a target code rate for each program from the temporary target code rate in such a manner that the sum of the temporary target code rates calculated for each program data is in a specific allowable range and inputting the calculated target code rate to each encoding means for each program data, wherein a corresponding relationship between the encoding difficulty and the target code rate is set in such a manner that the larger the encoding difficulty is, the larger the target code rate becomes, and that in a specific range in which the encoding difficulty is larger than an average value of the encoding difficulty, a target code rate corresponding to the same encoding difficulty is lowered as compared with a case in which the encoding difficulty and the target code rate have a proportional relationship, whereas in a specific range in which the encoding difficulty is smaller than the average value of the encoding difficulty, the target code rate corresponding to the same encoding difficulty is raised as compared with a case in which the encoding difficulty and the target code rate have a proportional relationship.

* * * * *